United States Patent
Al-Shaikhi et al.

(10) Patent No.: US 10,849,084 B1
(45) Date of Patent: Nov. 24, 2020

(54) ASYNCHRONOUS REALIZATIONS BASED ON ACCURATE, ENERGY-EFFICIENT, DECENTRALIZED, SINGLE-HOP TIME SYNCHRONIZATION PROTOCOL FOR WSNS

(71) Applicant: KING FAHD UNIVERSITY OF PETROLEUM AND MINERALS, Dhahran (SA)

(72) Inventors: Ali Al-Shaikhi, Dhahran (SA); Ramadan Abdul-Rashid, Dhahran (SA); Ahmed Masoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/783,827

(22) Filed: Feb. 6, 2020

Related U.S. Application Data

(60) Provisional application No. 62/924,831, filed on Oct. 23, 2019.

(51) Int. Cl.
*H04W 24/00* (2009.01)
*H04W 56/00* (2009.01)
(Continued)

(52) U.S. Cl.
CPC ......... *H04W 56/001* (2013.01); *H04W 24/04* (2013.01); *H04W 84/18* (2013.01); *H04W 88/16* (2013.01)

(58) Field of Classification Search
CPC .......... H04J 4/00; H04B 7/2615; H04L 43/50; H04W 24/00; H04W 24/06; H04W 24/08
See application file for complete search history.

(56) References Cited

U.S. PATENT DOCUMENTS 10,143,038 B1 * 11/2018 Stamatakis ............ G01D 21/00
2006/0271661 A1 * 11/2006 Qi .......................... H04L 67/12
709/223
(Continued)

FOREIGN PATENT DOCUMENTS

| CN | 108900273 A | 11/2018 |
|---|---|---|
| EP | 3 253 139 B1 | 2/2019 |
| KR | 10-1510893 B1 | 4/2015 |

OTHER PUBLICATIONS

Ramadan Abdul-Rashid, et al., "Accurate, Energy-Efficient, Decentralized, Single-Hop, Asynchronous Time Synchronization Protocols for Wireless Sensor Networks", ARXIV:1811.01152v1, [eess. SP], https://arxiv.org/pdf/1811.01152.pdf, Nov. 3, 2018, pp. 1-19.

*Primary Examiner* — Shantell L Heiber
(74) *Attorney, Agent, or Firm* — Oblon, McClelland, Maier & Neustadt, L.L.P.

(57) ABSTRACT

A system and method for monitoring a predetermined condition in a harsh environment, includes wireless sensor nodes each having a physical clock and a soft clock. The sensor configured to detect the predetermined condition. Each wireless sensor node remains in a sleep mode, then independently, when a triggering event is true, the soft clock evolves a value of a dynamical local time variable using time variable values communicated by random other of the wireless sensor nodes that are within a single hop based on the harsh environment, infers from its dynamical local time variable the communication instant at which the dynamical local time variable is closest to the time value of the gateway node, and initializes the physical clock using the value of the dynamical local time variable at that instant to generate and communicate the local node time through the gateway node to the end-user device.

20 Claims, 34 Drawing Sheets

(51) Int. Cl.
*H04W 24/04* (2009.01)
*H04W 84/18* (2009.01)
*H04W 88/16* (2009.01)

(56) References Cited

U.S. PATENT DOCUMENTS

2008/0253327 A1* 10/2008 Kohvakka ............... H04L 67/04
370/330
2009/0252087 A1* 10/2009 Jiang .................... H04L 67/125
370/328
2010/0316009 A1* 12/2010 Han .................... H04W 72/082
370/329

* cited by examiner

Algorithm 1 Synchronization Pseudo-code for Node $i$

1: Initialization
2: Wake-up from sleep mode
3: Clear Repository
4: $t_c \leftarrow \tau_i(0); t_s \leftarrow 0;$
5: Initialize $R$;     ▷ Resynchronization Period
6: Initialize $\sigma_{max}$ ;   ▷ Upper bound on the convergence time
7: $I_T \leftarrow 1;$     ▷ Time value request trigger
8: $I_U \leftarrow 1;$     ▷ Soft clock estimation trigger
9: $I_S \leftarrow 0;$     ▷ Dip stage trigger
10: $I_R \leftarrow 0;$     ▷ Response to neighbor request trigger
11: if $I_S = 1$ then
12:     $t_i \leftarrow t_s$
13: else if $I_S = 0$ then
14:     $t_i \leftarrow t_c$
15: while $I_U = 1$ do
16:     if $I_T = 1$ then
17:         Send request for $<t_j>$ from nodes $j \in N_i$
18:     Upon receiving all $<t_j>$s
19:     Compute neighborhood time estimate, $t_s$
20:     for Each estimate $t_s$ do
21:         if $t_s$ is at dip stage then
22:             Set $I_S \leftarrow 1$
23:             Set $t_c \leftarrow t_s$
24:         else if $t_s$ is not at dip stage then
25:             Set $I_S \leftarrow 0$
26: while $I_S = 1$ do

FIG. 6

27:     Set $I_U \leftarrow 0$ and $I_T \leftarrow 0$
28:     Switch node to stand-by mode
29:     Set timer-1 to fire after $\sigma_{max}$ seconds
30:     Until timer-1 timeout,
31:       if A request is received from node *j* then
32:         Set $I_R \leftarrow 1$
33:       else if No request is received then
34:         $I_R \leftarrow 0$
35: if $I_S = 1$ and $I_R = 0$ then
36:     Set timer-2 to fire after $R$ seconds
37:     Node goes to sleep mode
38: if $I_R = 1$ then
39:     Send $<t_i>$ and Reset timer-1 after timeout
40: Upon timer-2 timeout
41: Node wakes up to resynchronize

FIG. 6 (Cont'd)

Algorithm 2: TSAU Pseudo-Code for Node $i$

Initialization

$\quad t_i \leftarrow t_i(0)$; *UpdateTime* $\leftarrow i \times \Delta$;

$\quad$ *clockSum* $\leftarrow$ 0; *totalReceived* $\leftarrow$ 0;

If < *UpdateTime* > is a multiple $\Delta$

If < $t_j$ > is received

*clockSum* $\leftarrow$ *clockSum* + ($t_j$);

*totalReceived* $\leftarrow$ *totalReceived* + 1;

$t_{av} \leftarrow$ *clockSum/totalReceived*;

*UpdateTime* $\leftarrow$ *UpdateTime* + (N - 1) $\times \Delta$;

Upon every $\Delta$ seconds

If *totalReceived* > 1 and *IncomingID* = Node *j*

$t_i \leftarrow t_{av}$

*clockSum* $\leftarrow$ 0; *totalReceived* $\leftarrow$ 0;

broadcast < $t_i$ >

FIG. 9

Algorithm 3: UAF Pseudo-Code for Node $i$

☐ Initialization

$t_i \leftarrow t_i(0);\ s_i \leftarrow 0;\ clockSum \leftarrow 0;\ totalReceived \leftarrow 0;$ ☐ Upon receiving $< t_j, s_j >$

If $< s_j \neq s_i >$ then

$clockSum \leftarrow clockSum + (t_j)$ $totalReceived \leftarrow totalReceived + 1$ $t_{av} \leftarrow clockSum/totalReceived$ $s_i \leftarrow s_j$ else if $< s_j = s_i >$ then $t_{av} \leftarrow t_i$ endif

☐ Upon every $\Delta$ seconds

$t_i \leftarrow t_{av}$ $clockSum \leftarrow 0;\ totalReceived \leftarrow 0;$ broadcast $< t_i, s_i >$

FIG. 12

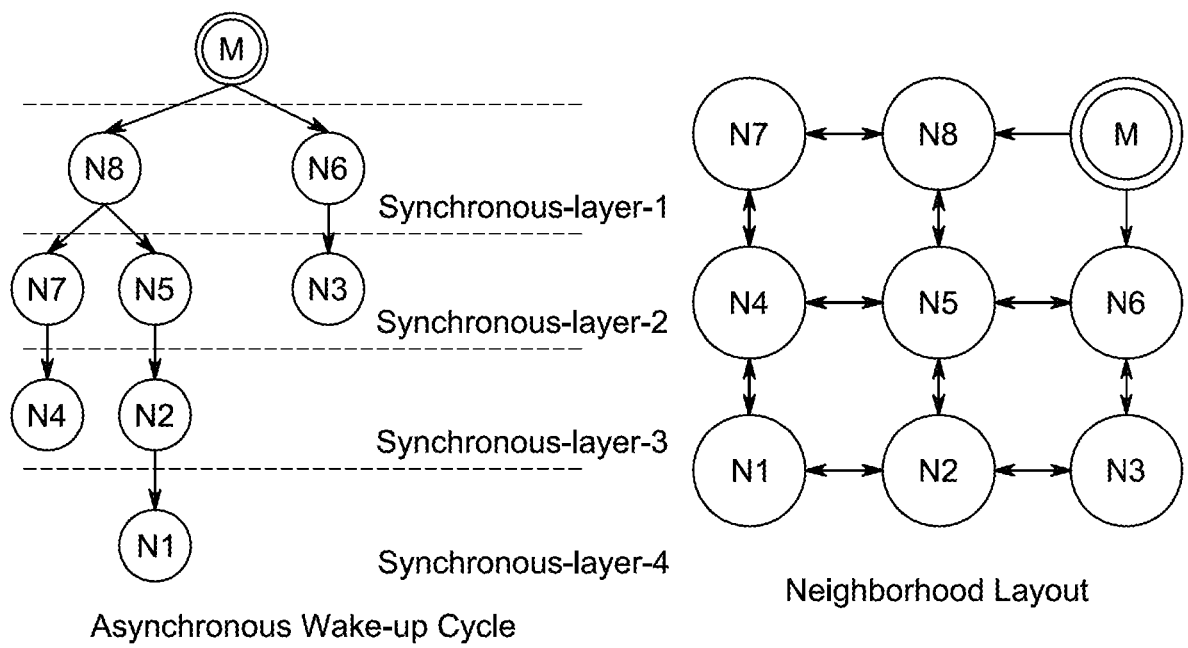

Asynchronous Wake-up Cycle  Neighborhood Layout

FIG. 13

Algorithm 4: BAF Pseudo-Code for Node $i$

☐ Initialization

$t_i \leftarrow t_i(0)$; $s_i \leftarrow 0$; $c_i \leftarrow 0$; *clockSum* $\leftarrow 0$; *totalReceived* $\leftarrow 0$;

☐Upon receiving $< t_j, s_j, c_j >$

If $< s_j \neq s_i >$ then

*clockSum* $\leftarrow$ *clockSum* + $(t_j)$

*totalReceived* $\leftarrow$ *totalReceived* + 1

$t_{av} \leftarrow$ *clockSum/totalReceived*

$s_i \leftarrow s_j$ $c_i \leftarrow c_j + 1$ else if $< s_j = s_i >$ then $t_{av} \leftarrow t_i$ endif if $< s_j = s_i >$ and $c_i > c_j, \forall_j$ then $c_i \leftarrow 0$ and $s_i \leftarrow \bar{s}_i$ endif

☐ Upon every $\Delta$ seconds

$t_i \leftarrow t_{av}$

*clockSum* $\leftarrow 0$; *totalReceived* $\leftarrow 0$ broadcast $< t_i, s_i, c_i >$

FIG. 15

ASYNCHRONOUS REALIZATIONS BASED ON ACCURATE, ENERGY-EFFICIENT, DECENTRALIZED, SINGLE-HOP TIME SYNCHRONIZATION PROTOCOL FOR WSNS

CROSS-REFERENCE TO RELATED APPLICATIONS

This application claims the benefit of priority to provisional application Ser. No. 62/924,831 filed Oct. 23, 2019, the entire contents of which are incorporated herein by reference.

STATEMENT REGARDING PRIOR DISCLOSURE BY THE INVENTORS

Aspects of this technology are described in an article, Rashid, Ramadan & Al-Shaikhi, Ali & Masoud, Ahmad. (2018). Accurate, Energy-Efficient, Decentralized, Single-Hop, Asynchronous Time Synchronization Protocols for Wireless Sensor Networks. The article was published online Nov. 3, 2018, and is herein incorporated by reference in its entirety.

BACKGROUND

Technical Field

The present disclosure is directed to method, system, apparatus and computer program product that utilize an efficient, decentralized synchronization protocol especially useful for an infrastructure-impoverished Wireless Sensor Network in a harsh environment.

Description Of The Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Wireless sensor networks (WSN) are important practical systems used in a multitude of applications involving monitoring, instrumentation, and recording the physical conditions of the environment. WSNs contain sensors that measure environmental conditions including temperature, pressure, humidity, wind speed, pollution levels, sound, vibration, and existence of gases. They may be deployed under harsh conditions such as in environments with extreme unstable temperatures, heavy storms, vibrations, concentrated chemicals, electrical shocks, and mechanical pressures. The nodes of a WSN are required to communicate their time-stamped, sensed data to a gateway node. This, in turn requires the WSN nodes to be closely synchronized to the time of that node.

The use of virtual clocks for synchronizing communication networks that are without infrastructure is fairly recent and is based on consensus control methodologies. The synchronization accuracy of most existing methods that use the virtual clock concept is relatively low and is not suitable for practical operation. The methods keep the virtual clocks running for a long time until steady state is reached. This uses excessive communication and causes battery depletion. No known methods combine virtual clocks and physical clocks to create a synchronized timing system. A reason for this may be the inability to determine specific points in time to stop the virtual clock and reactivate it again.

Some techniques using virtual clocks attempt to improve accuracy by augmenting averaging with other operations such as integration. The result jeopardizes the stability of the virtual clock. This also imposes severe limitations on the structure of the network and leads to the loss of unconditional stability that allows flexibility in network connectivity and operation when connectivity is time variant. Furthermore, known techniques using virtual clocks have not been implemented on an actual communication network with no infrastructure (e.g. a sensor network).

It is one object of the present disclosure to describe time synchronization procedures, methods, systems and machines that operate on or with a WSN and that are simple, efficient, robust and have high rate of convergence so as to keep network nodes synchronized on-demand and at all times. In some aspects, a decentralized synchronizing paradigm is developed, and three realizations of this paradigm are provided. They are termed: Timed Sequential Asynchronous Update (TSAU), Unidirectional Asynchronous Flooding (UAF) and the Bidirectional Asynchronous Flooding (UAF). In a further aspect, the synchronizing paradigm may be applied to monitoring for dynamic emergency situations such as fires, landslides, flooding waters in which sensor nodes are not only exposed to harsh or hazardous environments, but in which some sensor nodes may incur failure leading to variation in network topology.

SUMMARY

In an exemplary embodiment, a system for monitoring at least one predetermined condition in a harsh environment is described, including a plurality of wireless sensor nodes, each node including at least one sensor, a wireless communications device, a physical clock, and circuitry for a soft clock, the at least one sensor configured to detect the at least one predetermined condition; a gateway node including a wireless communications device and configured to maintain a gateway time value; a wireless communication network interconnecting the plurality of wireless sensor nodes and connecting at least one of the wireless sensor nodes to the gateway node; and an end-user computer device having access to the gateway node. The wireless sensor nodes are configured to communicate time-stamped sensed data based on a local node time through the gateway node to the end-user device. Each wireless sensor node is configured to remain in a sleep mode, then independently, when a triggering event is true, the circuitry for the soft clock evolves a value of a dynamical local time variable using time variable values communicated by at least one random other of the wireless sensor nodes that is within a single hop based on the harsh environment, infers from its dynamical local time variable the communication instant at which the dynamical local time variable is closest to the time value of the gateway node, and initializes the physical clock using the value of the dynamical local time variable at that instant to generate the local node time.

In another exemplary embodiment, a method of monitoring at least one predetermined condition in a harsh environment, performed in a system including a plurality of wireless sensor nodes, each node including at least one sensor, a wireless communications device, a physical clock, and circuitry for a soft clock, the at least one sensor configured to detect the at least one predetermined condition, a gateway node including a wireless communications device and configured to maintain a gateway time value; a wireless communication network interconnecting the plurality of wireless sensor nodes and connecting at least one of the wireless sensor nodes to the gateway node; and an end-user computer device having access to the gateway node, wherein the wireless sensor nodes are configured to communicate time-stamped sensed data based on a local node time through the gateway node to the end-user device, each wireless sensor node is configured to remain in a sleep mode, then independently, when a triggering event is true, the method, performed by circuitry for the soft clock, including evolving a value of a dynamical local time variable using time variable values communicated by at least one random other of the wireless sensor nodes that is within a single hop based on the harsh environment; inferring from its dynamical local time variable the communication instant at which the dynamical local time variable is closest to the time value of the gateway node; and initializing the physical clock using the value of the dynamical local time variable at that instant to generate the local node time.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 6 is a pseudo-code listing for the exemplary synchronization procedure;

FIG. 9 is a pseudo-code listing for a time sequential asynchronous update procedure in accordance with an exemplary aspect of the disclosure;

FIG. 12 is a pseudo-code listing for a unidirectional asynchronous flooding procedure in accordance with an exemplary aspect of the disclosure;

FIG. 13 is a diagram of an asynchronous wake-up cycle and operation mechanism for the unidirectional asynchronous flooding procedure in accordance with an exemplary aspect of the disclosure;

FIG. 15 is a pseudo-code listing for a bidirectional asynchronous flooding procedure in accordance with an exemplary aspect of the disclosure;

DETAILED DESCRIPTION

Figure 1:
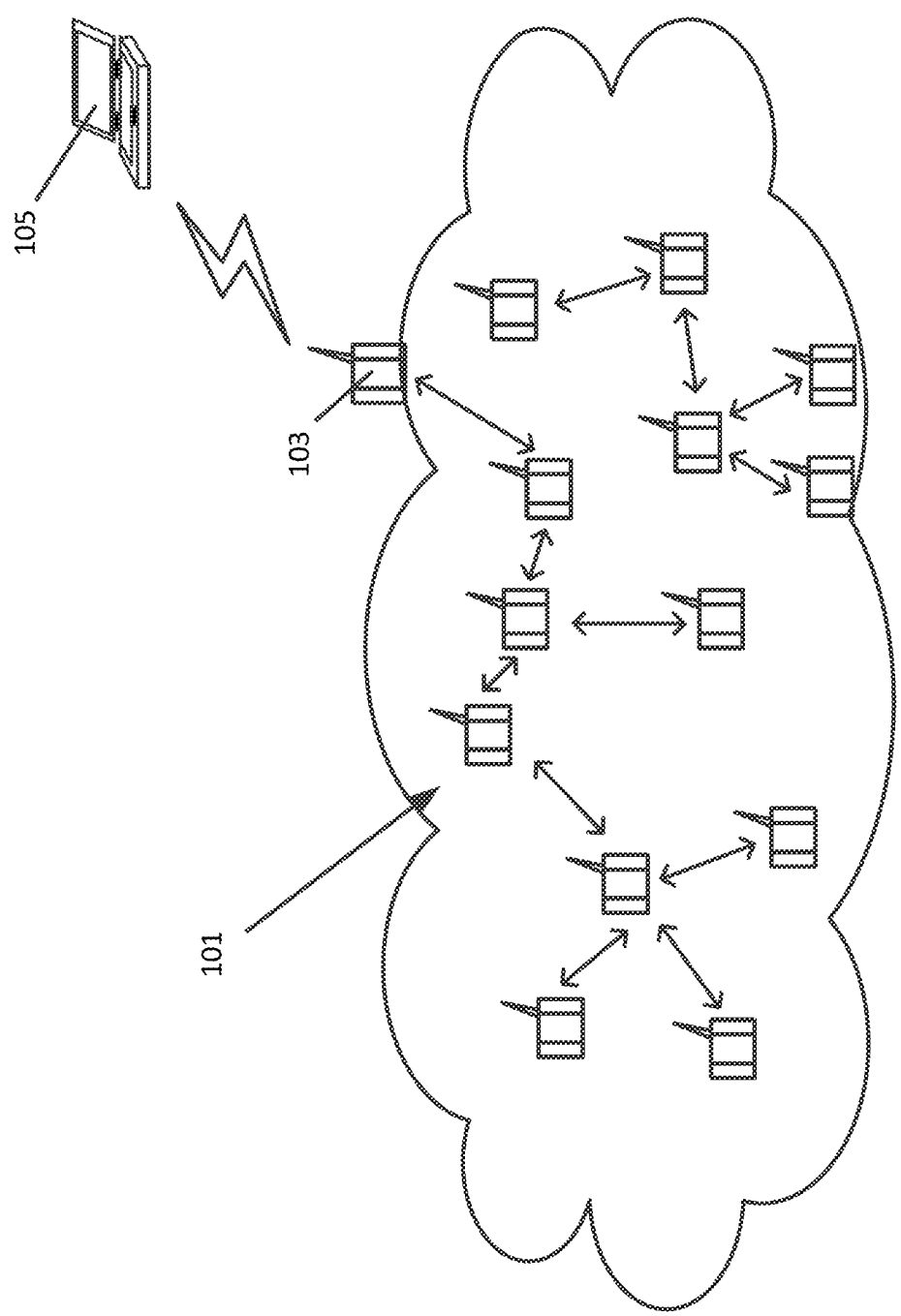
FIG. 1 is a system diagram for a wireless sensor network.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are an efficient, decentralized synchronization procedure that suits an infrastructure-impoverished WSN operating in a harsh environment. In embodiments the present disclosure includes methods and systems for decentralized synchronization of an infrastructure-impoverished WSN. Communication among the sensor nodes of the network is carried out in an event-based asynchronous manner. The disclosed approach departs from existing decentralized approaches by assuming that local time is a free-evolving dynamical variable that is not corrected for drift and skew. In clock synchronization, skew is a phenomenon in which the same sourced clock signal arrives at different components at different times. The skew is the difference between the readings of any two clocks. Clock drift is a phenomenon where a clock does not run exactly the same rate as a reference clock. Subsequently, one clock may desynchronize (i.e., drift apart, diverge) from another clock.

Each sensor node, independently, when the triggering event is true, evolves the value of that variable using the time variables communicated by its single hop neighbors. The procedure can infer from its local time variable only the communication instant at which the variable is closest to the time of a gateway node. The value of the variable at that instant is used to initialize the physical clock of the node to generate the local time. It is observed that local determination of the instant at which local time of a sensor node is closest to the time maintained in the gateway can be done at high accuracy with small communication overhead.

Because the synchronization procedure works by way of communication between single hop neighbors, the procedure may be performed when the network has random connectivity. The performance of the procedure gracefully degrades, i.e., the procedure can continue to be performed, with reduced communication link connectivity in situations where the number of single hop neighbors diminishes. Also, the procedure is scalable for a large scale network.

Each sensor node performs the same synchronization procedure. The same synchronization procedure can be downloaded to each sensor node. This synchronization procedure is simple enough such that it can be performed by inexpensive processing hardware. The procedure requires relatively low bandwidth since communication exchange is only between single hop neighbors. Also, the physical clock of a sensor node may be used to turn off communication when communication is not needed. The procedure has a fast rate of convergence and can quickly synchronize a network as compared to known decentralized approaches. The procedure despite its simplicity can yield accurate synchronization relative to the data exchange rate among the nodes as compared to known methods that use a virtual clock until a steady state is reached.

The synchronization procedure does not depend on rigid network wide node labeling in order to function. Instead, it uses, short-term dynamic, node-centered labeling. This makes it suitable for large scale networks operating in harsh environments where network discovery is difficult or impossible. Also, the sensor nodes need not be initially set to the same time in order for the procedure to function. Even if the sensor nodes initially start with random values for time, they will all converge to the same value. This enables the addition or removal of sensor nodes while the network is operating without endangering the network's ability to synchronize.

FIG. 1 is a system diagram for a typical wireless sensor network on which aspects of the present disclosure may be implemented. A wireless sensor network includes a sensor field of wirelessly connected sensor nodes 101 which communicate outside of the sensor field by way of a gateway 103. The gateway 103 may serve as a bridge between a local area network, a wide area network and the WSN. The gateway 103 may communicate through another network, such as the Internet, or may be directly connected to a user device 105, via Ethernet, WiFi, Bluetooth, to name a few communications systems.

Figure 2:
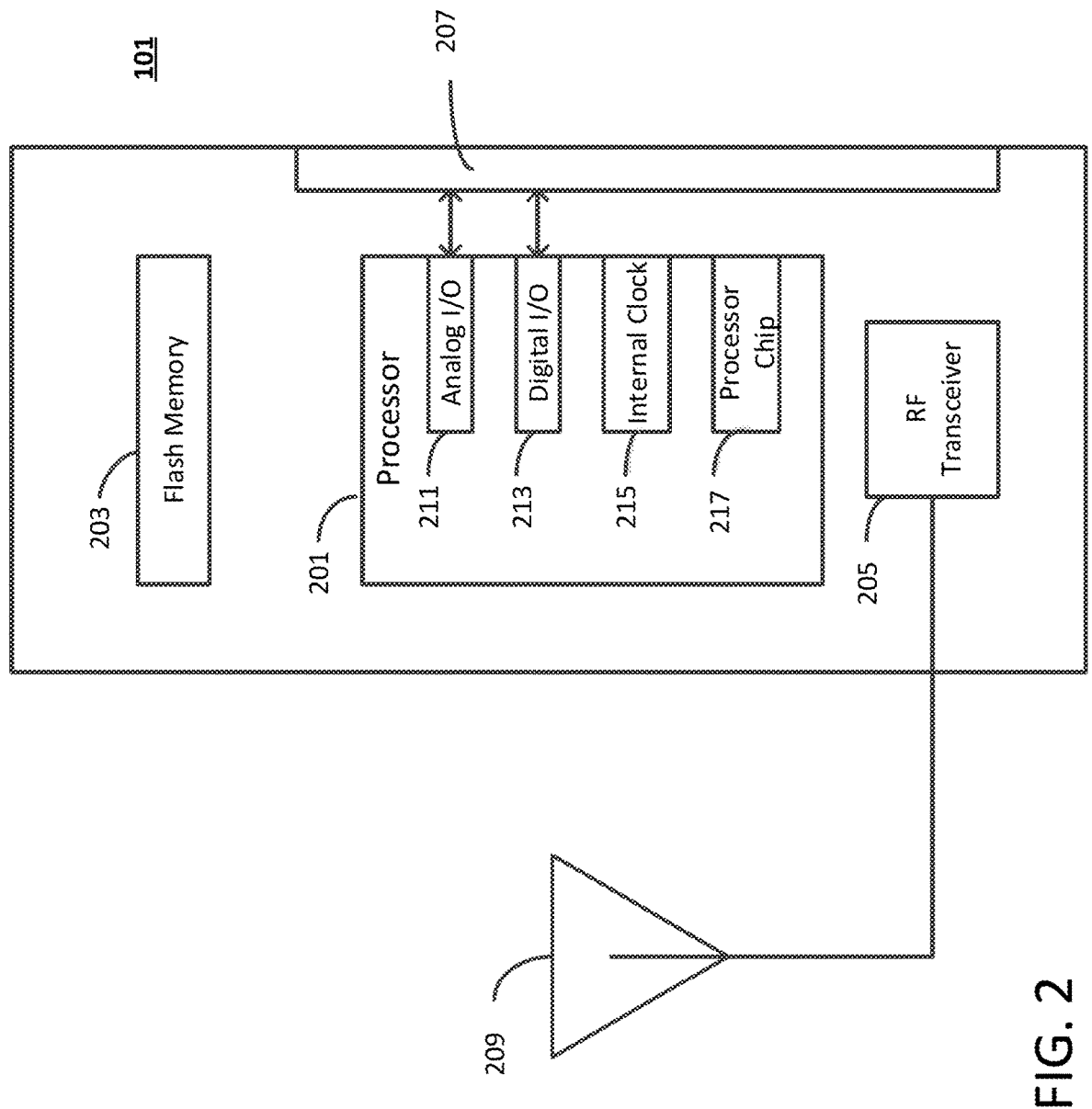
FIG. 2 is a block diagram of a sensor node device.

FIG. 2 is a block diagram of a sensor node device, also referred to as a mote. The sensor node device 101 includes as a minimum a sensing unit, a processor, a transceiver unit, and a power unit. In an exemplary embodiment, a sensor node device 101 may include a microprocessor 201, a local non-volatile memory, such as Flash 203 to store sensed data and program instructions, an RF transceiver 205, and a power supply. The sensor node device 101 may also include a set of pins 207 for expansion connection to one or more sensors, and an antenna 209. The pins 207 may be for transmission of analog signals that are handled by an analog I/O interface 211 or may be for transmission of digital signals that are handled by a digital I/O interface 213. The processor 201 further includes an internal clock 215, herein referred to as a physical clock, and a processor chip 217 for performing processing instructions. The RF transceiver 205 of the sensor node device 101 may be configured to communicate based on the IEEE 802.15.4 protocol under the control of the processing instructions. A sensor is a transducer that converts physical phenomenon such as heat, light, motion, vibration, and sound into electrical signals. A sensing unit may include an A/D converter if connected directly to a processor.

Figure 3:
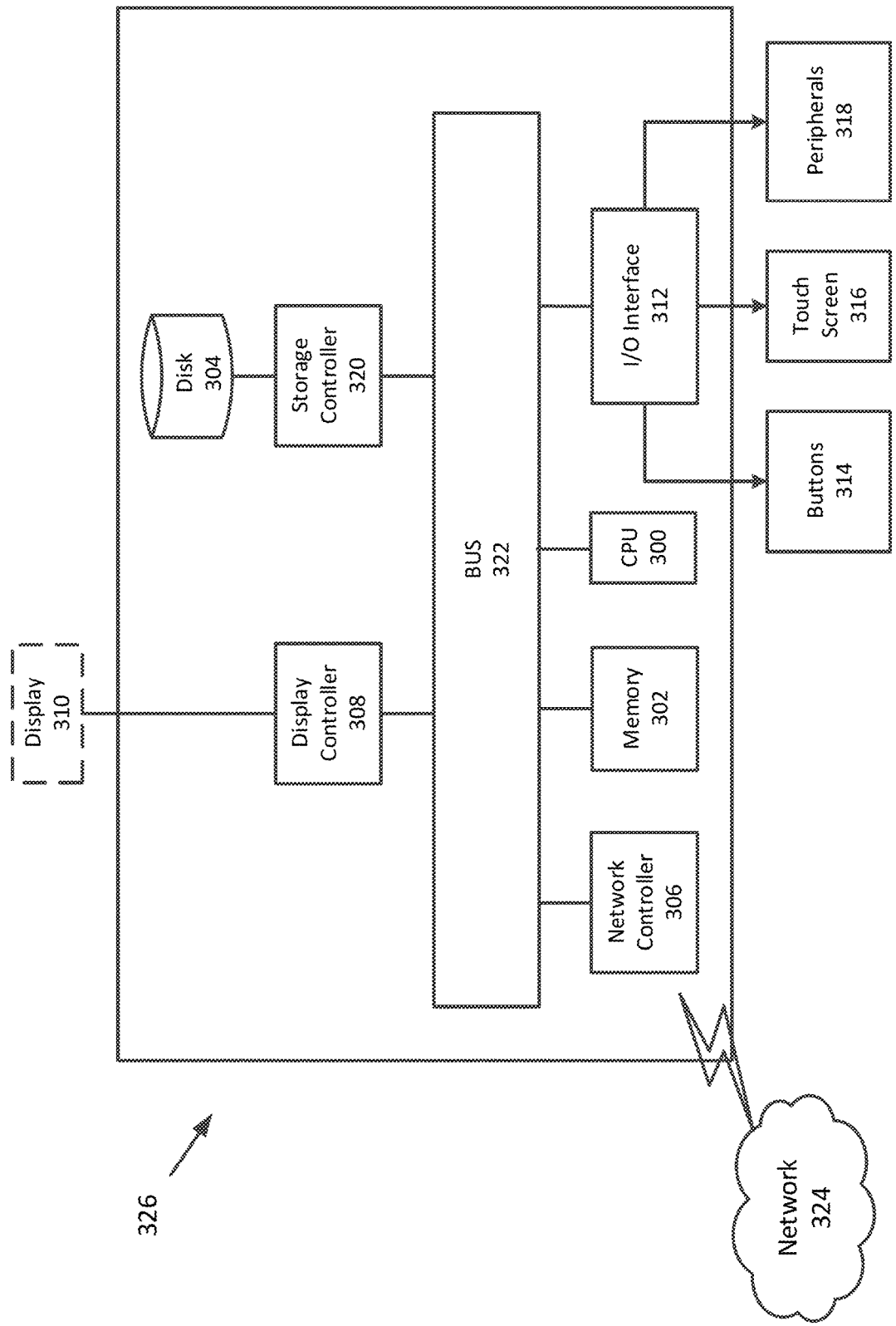
FIG. 3 is a block diagram of a computer system for a gateway or user device.

In one implementation, the functions and processes of the gateway 103 and user device 105 may be implemented as a computer system 326. Next, a hardware description of the computer system 326 according to exemplary embodiments is described with reference to FIG. 3. In FIG. 3, the computer system 326 includes a CPU 300 which performs the processes described herein. The process data and instructions may be stored in memory 302. These processes and instructions may also be stored on a storage medium disk 304 such as a hard drive (HDD) or portable storage medium or may be stored remotely. Further, the advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer system 326 communicates, such as a server or computer.

Further, the advancements may be provided as a utility application, background daemon, or component of an operating system, or combination thereof, executing in conjunction with CPU 300 and an operating system such as Microsoft® Windows®, UNIX®, Oracle® Solaris, LINUX®, Apple macOS® and other systems known to those skilled in the art.

In order to achieve the computer system 326, the hardware elements may be realized by various circuitry elements, known to those skilled in the art. For example, CPU 300 may be a Xenon® or Core® processor from Intel Corporation of America or an Opteron® processor from AMD of America, or may be other processor types that would be recognized by one of ordinary skill in the art. Alternatively, the CPU 300 may be implemented on an FPGA, ASIC, PLD or using discrete logic circuits, as one of ordinary skill in the art would recognize. Further, CPU 300 may be implemented as multiple processors cooperatively working in parallel to perform the instructions of the inventive processes described above.

The computer system 326 in FIG. 3 also includes a network controller 306, such as an Intel Ethernet PRO network interface card from Intel Corporation of America, for interfacing with network 324. As can be appreciated, the network 324 can be a public network, such as the Internet, or a private network such as LAN or WAN network, or any combination thereof and can also include PSTN or ISDN sub-networks. The network 324 can also be wired, such as an Ethernet network, or can be wireless such as a cellular network including EDGE, 3G, 4G and 5G wireless cellular systems. The wireless network can also be WiFi®, Bluetooth®, or any other wireless form of communication that is known.

The computer system 326 further includes a display controller 308, such as a NVIDIA® GeForce® GTX or Quadro® graphics adaptor from NVIDIA Corporation of America for interfacing with display 310, such as a Hewlett Packard® HPL2445w LCD monitor. A general purpose I/O interface 312 interfaces with a keyboard and/or mouse 314 as well as an optional touch screen panel 316 on or separate from display 310. General purpose I/O interface also connects to a variety of peripherals 318 including printers and scanners, such as an OfficeJet® or DeskJet® from Hewlett Packard®.

The general purpose storage controller 320 connects the storage medium disk 304 with communication bus 322, which may be an ISA, EISA, VESA, PCI, or similar, for interconnecting all of the components of the computer 326. A description of the general features and functionality of the display 310, keyboard and/or mouse 314, as well as the display controller 308, storage controller 320, network controller 306, and general purpose I/O interface 312 is omitted herein for brevity as these features are known.

Wireless sensor networks may be particularly applicable to monitoring harsh environments and locations having no access to an external power supply. Harsh environments in which a WSN may be deployed include forest fire detection, landslide detection, water quality monitoring, natural disaster prevention such as flood detection, waste water monitoring, air and water pollution, and nuclear, biological, and chemical detection.

Wireless links in a wireless network enable mobility in arrangement and portability to different areas. Also, wireless links allow deploying sensor stations in locations that are difficult to access. For example, wireless sensor nodes may be deployed in rivers, in chemical solutions, or on land where they would be exposed to various environmental and weather conditions.

However, several factors need to be addressed in order to accomplish wireless sensor networks that can monitor harsh environments. In particular, several factors have to be addressed in order to achieve flexible and robust time synchronization for a WSN. Some of these factors are: the scarcity of energy of the deployed nodes, scalability and the need for large scale WSNs, decentralized topologies, and/or unpredictable and intermittent connectivity between network nodes. The constraints of limited resources and operation in harsh environments require a time synchronization procedure that is simple, efficient, robust and has high rate of convergence so as to keep network nodes synchronized on-demand or at all times.

To meet the challenges a harsh environment imposes, the disclosed synchronization procedure exploits the synergy between the hardware and the software parts of the sensor network. The nodes are programmed so that the overall network forms a discrete dynamical system whose states represent the time estimate each node has for the time of the gateway node. All the nodes use identical programs for updating their local time estimates (i.e. protocols). These programs require input data only from the immediate neighbors of a node. They execute in an asynchronous manner that depends only on their local states and the local data they acquire. As a whole, the network may be represented as a discrete, switched dynamical system, $$T_k = A\sigma T_{k-1} + B\sigma t_{gk} \quad (1)$$

Where, $T_k$ is a vector whose elements are the evolving time series which each node uses to determine the gateway time. $A_\sigma$ is an (N−1)×(N−1) matrix representing a switched connectivity matrix which is controlled by a switching rule σ of a WSN with N−1 nodes and 1 gateway node and B is an (N−1) vector whose structure changes based on a switching rule σ and $t_{gk}$ represents the evolving gateway time.

Each node updates based on a sub-dynamical system:

$$t_{ik} = a\sigma_i t_{i(k-1)} + b\sigma_i t_{gk} \quad (2)$$

Each discrete instant in time, k, represents a communication attempt among the nodes that cause an energy drain that cannot be neglected in the operation of the network. Incurring an excessive communication overhead by having to wait until the system reaches steady state is not practical. The disclosed procedure solves this problem by a method that stops node update while the system is in the transient phase. As demonstrated, terminating operation in the transient phase does not only save communication energy, it also significantly increases the accuracy of the synchronization procedure. Moreover, all nodes terminate, independently, at approximately the same time. This makes it possible to utilize the knowledge about the quality of the hardware used and how fast the clock of a node drifts to schedule sleep and wake-up periods of the network.

Figure 4:
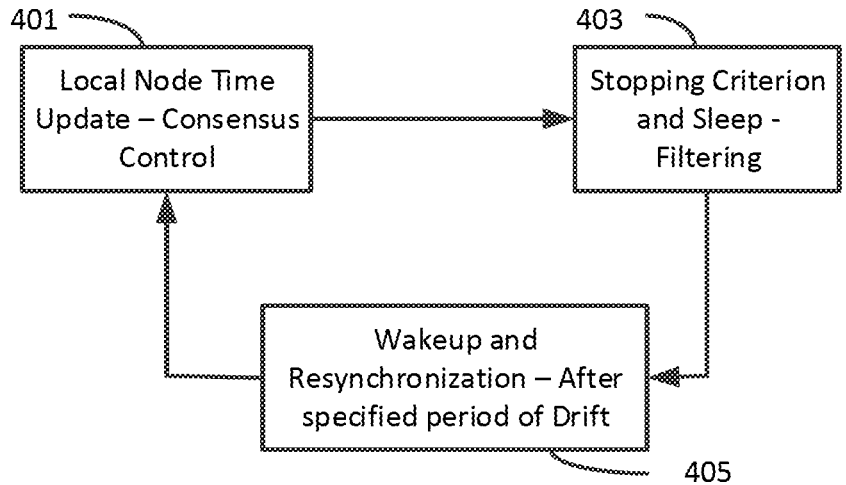
FIG. 4 is a block diagram of an exemplary synchronization procedure in accordance with an exemplary aspect of the disclosure.

The work-flow of the synchronizer is shown in FIG. 4. In 401, a node may perform node time update. In 403, the node may stop node update in accordance with a stopping criterion and may move into a sleep mode. In 405, a node may wake up and resynchronize after a predetermined period of time.

Asynchronous Paradigm

The discrete switched system, which represents the disclosed synchronization action of the network as a whole, is realized using two interconnected discrete dynamical systems. The states of the first sub-system ($T_k$) describe the time-like dynamical variables used by the nodes to determine the global time of the gateway node. The states of the second dynamical subsystem ($J_k$) have a binary nature (0,1) that is used to activate or inhibit a node time series update. The whole network dynamics is described using the equations in (3).

$$\begin{pmatrix} T_k \\ J_k 1 \end{pmatrix} = \begin{pmatrix} J_k(AT_{k-1} + \Delta kB) \\ F(J_{k-1}1) \end{pmatrix} \quad (3)$$

$$\text{Where, } J_k = \begin{bmatrix} J_{1k} & \cdots & 0 \\ \vdots & \ddots & \vdots \\ 0 & \cdots & J_{Nk} \end{bmatrix}$$

The non-zero components of $J_k$ at discrete time, k are expressed as a function of their state values at the previous time, k−1 and the activation function F(.) is determined by the method that establishes graph connectivity of the WSN. Where a node i is activated for update when $J_{ik}$ is '1' and inhibited from update when $J_{ik}$ is '0'.

Operational Modes of a Sensor Node

Figure 5:
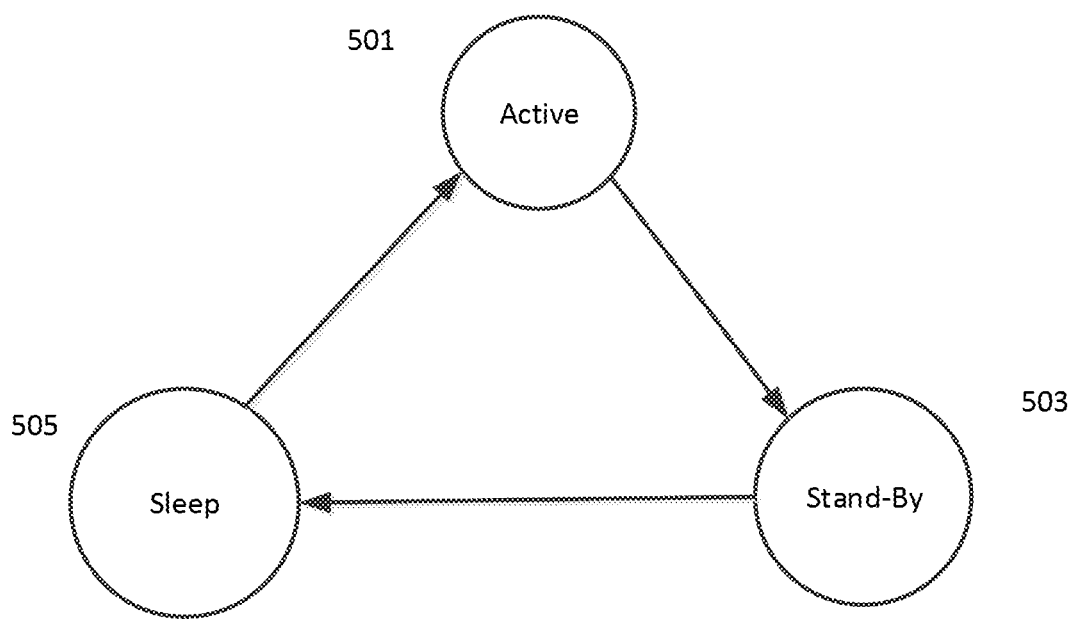
FIG. 5 is a state diagram of an operation cycle of a sensor node in accordance with an exemplary aspect of the disclosure.

WSN sensor nodes, also referred to as motes, are capable of performing processing, gathering sensory information and communicating with other nodes in the network. Due to the limited energy of WSN motes, they are designed to switch between active, sleep and stand-by modes during operation. The disclosed synchronizer exploits the active, sleep and stand-by modes in its asynchronous switching operation in order to minimize the amount of energy usage. In disclosed embodiments, the WSN sensor nodes cycle between these modes as illustrated in FIG. 5.

In the active mode 501, each WSN sensor node can:
1) Transmit a request message to request neighbors' time estimates;
2) Transmit a message including its time estimate;
3) Receive a request message from neighbors asking for its own time estimate;
4) Compute and update its time estimate.

In the stand-by mode 503, each WSN sensor node can:
1) Transmit messages that include values of its logical clock;
2) Receive request messages requesting its own logical clock.

In the sleep mode 505, each WSN sensor node does:
1) Keep physical clock running;
2) Monitor how much time has elapsed in order to switch to active mode.

Basic Mode of Operation of Time Synchronization Procedure

Figure 7:
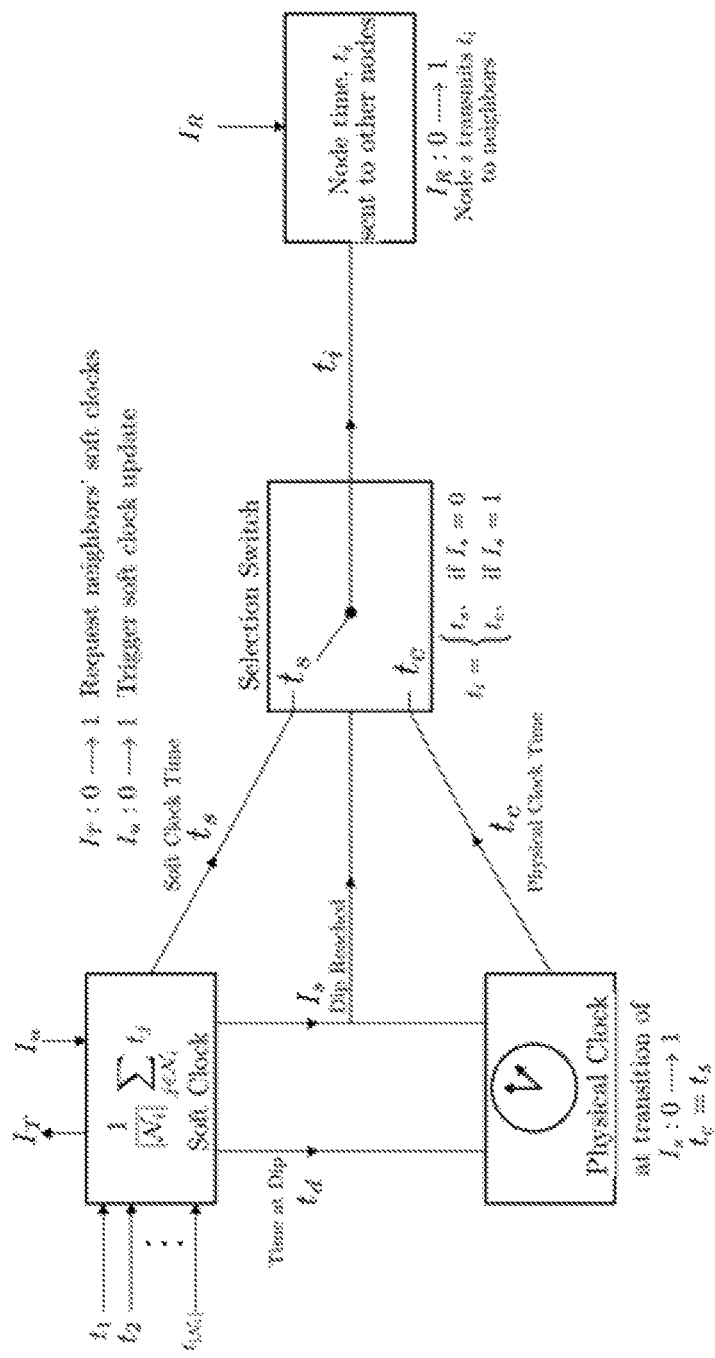
FIG. 7 is a block diagram of a synchronizer in accordance with an exemplary aspect of the disclosure.
Figure 8A:
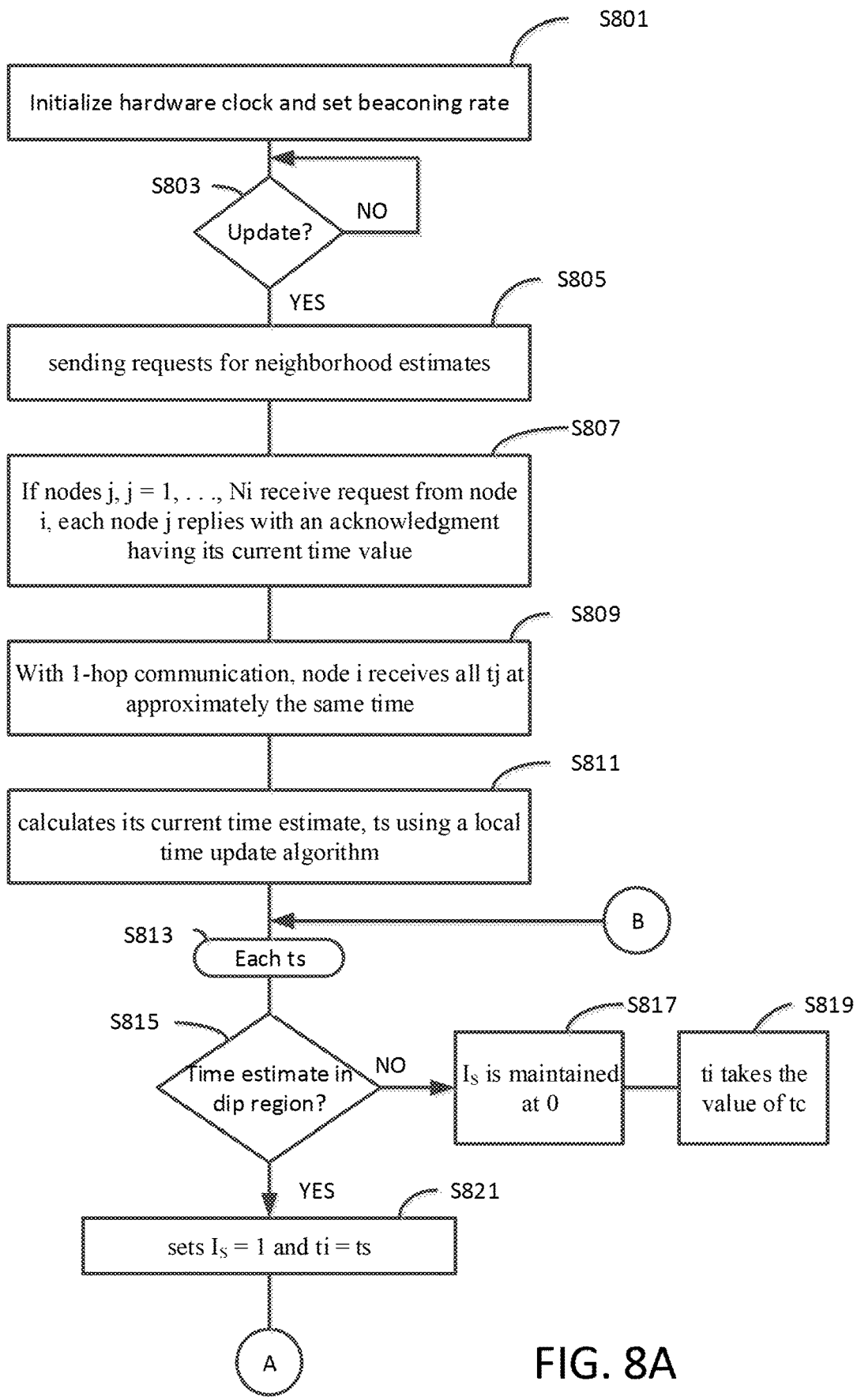
FIGS. 8A and 8B are flowcharts of a synchronization procedure of FIG. 6.
Figure 8B:
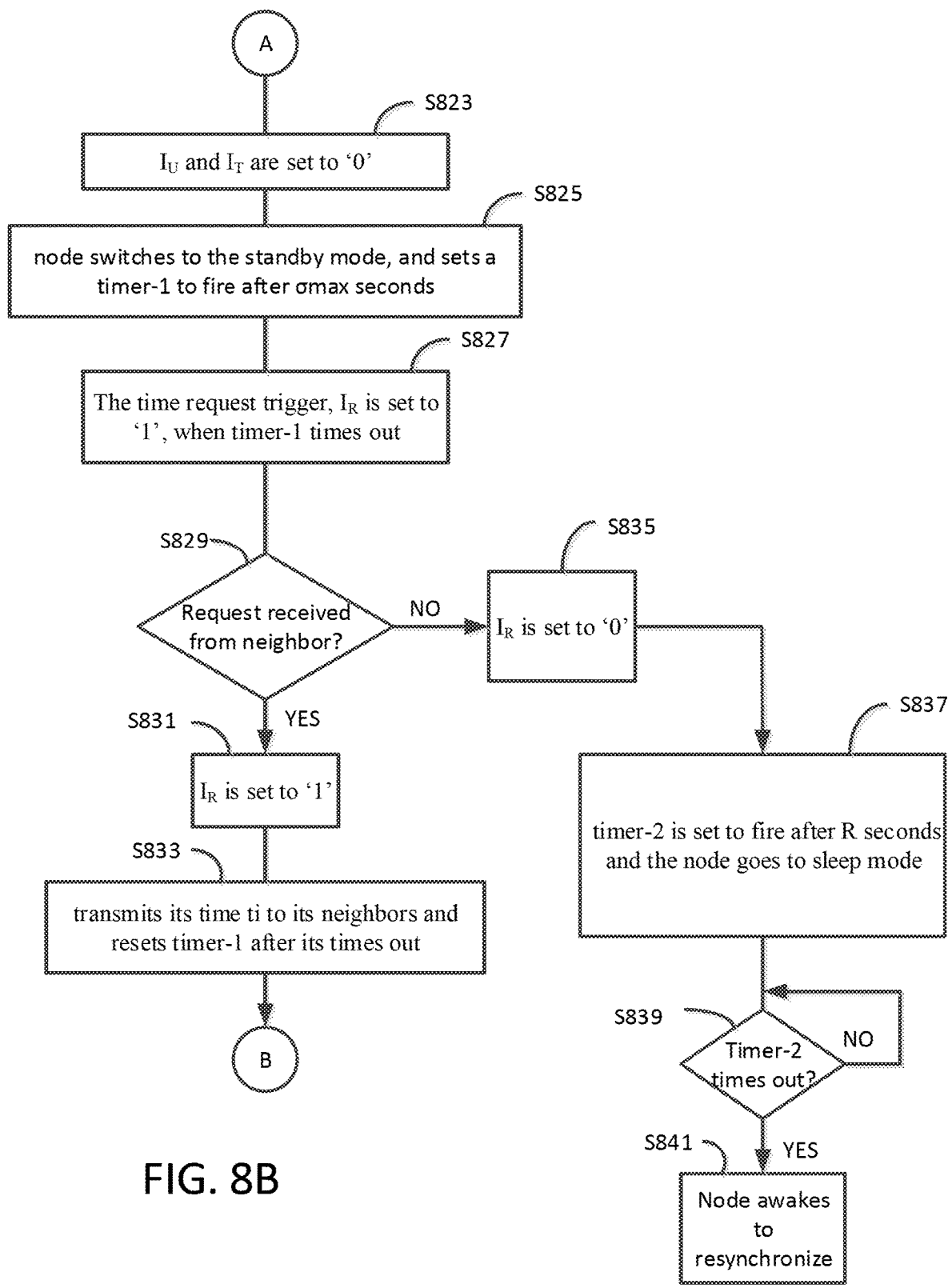

The disclosed synchronizer performs a time synchronization procedure. Three variations of the procedure are disclosed. The three variations are based on a basic mode of operation. The basic mode of operation for the time synchronization procedure is illustrated by FIG. 6 and FIG. 7 for an activated node i having Ni nearest neighbors and deployed in a network of size N. FIG. 8A, 8B is a flowchart of the basic mode of operation of the time synchronization procedure of FIG. 6.

In performing the basic mode of operation, a node i maintains two variables related to its clock (Line 4). One variable is a time soft clock variable, ts, which is an estimation of the gateway clock representing the global time estimate. The other variable is a logical clock variable, tc, which is a representation of the physical clock of node i and related to the internal hardware clock 215, τi. It has been determined that there exists a certain time estimate, ts, where the node's local time curve intersects with that of the gateway clock curve, and may be observed as a dip before steady state. At this point of intersection, a node is synchronized to the gateway node clock. The synchronizer makes nodes recognize and stop at this intersection point. A node i also maintains four binary variables (Lines 7-10) used to trigger specific actions. These variables are described as follows: • $I_T$ triggers when a node requests for neighbors' time values and is initialized to '1' (Line 7) • $I_U$ triggers when a node updates its time estimate and is initialized to '1' (Line 8) • $I_S$ is a dip stage detection trigger variable and is initialized to '0' (Line 9) • $I_R$ triggers response to neighbor request for node time and is initialized to '0' (Line 10)

The following describes the basic mode of operation. In S801, a node i initializes tc to the current hardware clock value, τi(0), and sets its beaconing rate, R, to a predetermined resynchronization period (Line 5). A variable σmax <<R representing an upper bound on the variance in the convergence time between all network nodes is also initialized (Line 6). A node i then sends request messages requesting neighborhood time estimates. In S803, While $I_U$=1 (update trigger is on; Yes in S803), if $I_T$=1 (time request trigger is on), in S805, node i sends request messages for neighborhood time values (Line 17). If nodes j,j=1, . . . ,Ni receive request from node i, in S807, each node j replies with an acknowledgment message having its current time value, tj as payload. In S809, with 1-hop communication, node i receives all tj at approximately the same time. Upon receiving all tj, in S811, node i calculates its current time estimate, ts, using a local time update algorithm (Line 19). For each estimate ts (S813), in S815, node i checks if ts is in the dip region. If true (Yes in S815), in S821, it sets $I_S$=1 and tc=ts. If not (No in S815), in S817, $I_S$ is maintained at 0 (Lines 20-25). As shown in FIG. 4, in S819, ti takes the value of tc when $I_S$=0 but is set to ts when $I_S$=1, which is akin to a selection switch with $I_S$ as the decision variable (Lines 11 to 14). In S823, while $I_S$=1, $I_U$ and $I_T$ are set to '0', the node switches to the standby mode, and sets a timer-1 to fire after σmax seconds. Where the update trigger variable $I_U$ is equivalent to Jik in equation 7. In S827, the time request trigger, $I_R$ is set to '1', when timer-1 times out (Lines 26-30). In S829, a check is made for a request received from a neighbor, If $I_S$=1 and $I_R$=1 (i.e., no request is made from neighbors and the node i is in standby; S831), in S833, node i replies with an acknowledgment having its current time value, tj as payload.

If $I_S$=1 and $I_R$=0 (i.e., no request is made from neighbors and the node i is in standby mode), a timer-2 is set to fire after R seconds and the node goes to sleep mode (Lines 35-37). $I_R$ is set to '1' anytime a request is received from neighbors and set to '0' otherwise (Lines 31-34). If $I_R$=1 node i, in S833, transmits its node time ti to its neighbors and resets timer-1 after it times out. In S839, the node remains in the sleep mode until timer-2 times out, when, in S841, it awakes to resynchronize.

Three variations of the basic synchronization procedure are presented. The pseudo-code and description of each variation aided by relevant diagrams are provided. It is assumed that for all methods, the gateway node ticks uniformly at a rate Δ, represented by $t_g(k)=\Delta \times k$.

Timed Sequential Asynchronous Update (TSAU)

Figure 10:
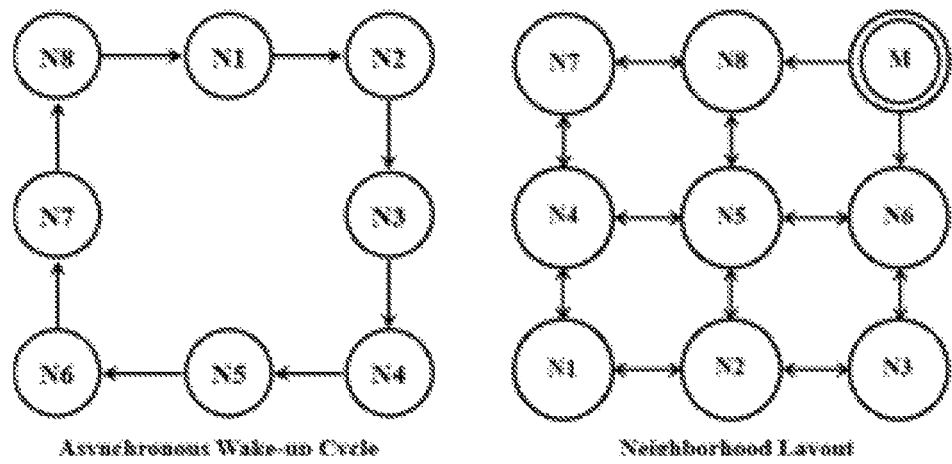
FIG. 10 is a diagram of an asynchronous wake-up cycle and operation mechanism for the time sequential asynchronous update procedure in accordance with an exemplary aspect of the disclosure.
Figure 11:
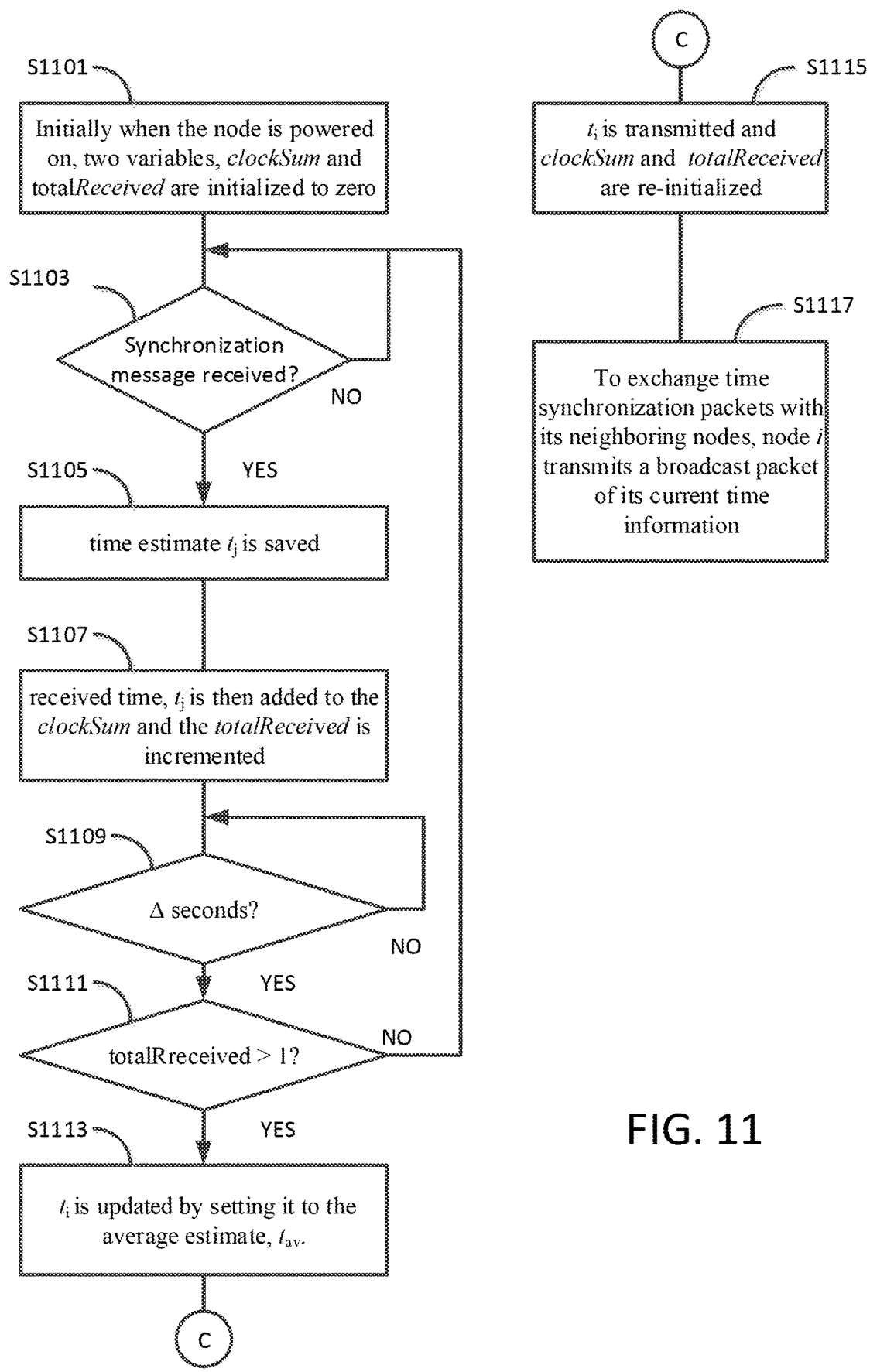
FIG. 11 is a flowchart of a time sequential asynchronous update procedure of FIG. 9.

In the first aspect named Timed Sequential Asynchronous Update (TSAU), network nodes are made to compute time estimates one at a time asynchronously in a sequential manner. The sequence of computing time estimates is based on proximity to the gateway node, i.e. the closer a node is to the gateway node, the earlier it updates. In this aspect, the Time Sequential Procedure, as in FIG. 6, is performed. The approach to establishing connectivity with other nodes of TSAU takes place in line 17 of the pseudo code of FIG. 6 (see step S805 in FIG. 8A) and in line 39 of FIG. 6 (see step S833 in FIG. 8B). The pseudo code of TSAU is illustrated in FIG. 9. The asynchronous wake-up cycle and operation mechanism for TSAU is illustrated in FIG. 10. FIG. 11 is a flowchart of the algorithm of FIG. 9.

Operation Mechanism: In S1101, initially when a node is powered on, two variables, clockSum and totalReceived required to calculate the average synchronization time estimate to the neighboring nodes are initialized to zero. Whenever a synchronization message from any neighboring node is received (Yes in S1103), in S1105, the time estimate $t_j$ of a neighboring node j at the time of reception, is saved. In S1107, the received time, $t_j$ is then added to the clockSum variable and the number of received clock values, totalReceived is incremented. To exchange time synchronization packets with its neighboring nodes, in S1117, node i transmits a broadcast packet of its current time information approximately every Δ seconds. In every Δ seconds (Yes in S1109), when the number of received clock values is more than one (Yes in S1111), the time variable of node i, in S1113, $t_i$, is updated by setting it to the average estimate, $t_{av}$. Finally, in S1115, the time estimate of node i, $t_i$, is transmitted and the clockSum variable and the number of received clock values, totalReceived are initialized.

In order for nodes to update in an atomic manner, node IDs are assigned based on proximity to the gateway node. Each node is programmed to update when the variable UpdateTime is a multiple of Δ. This variable is calculated by UpdateTime+=(N−1)×Δ where N is the number of network nodes including the gateway node. The UpdateTime for a node with ID, i is initialized to i×Δ. This allows the activation of the nodes to be carried out one at a time in a sequential manner.

Unidirectional Asynchronous Flooding (UAF)

In the second aspect, named Unidirectional Asynchronous Flooding (UAF), nodes update asynchronously based on a wake-up activation procedure regulated by the gateway node. This method differs from TSAU, in that it is designed to make nodes at approximately the same proximity to the gateway node update at the same communication instant. This is based on the assumption that the transmission and reception times of messages to and from their neighbors and/or to the gateway node are the same. The gateway node is made to regulate the activation of nodes by flooding the network with wake-up messages in every cycle of asynchronous update to begin the cycle. In this aspect, the Time Sequential Procedure, as in FIG. 6, is performed. The approach to establishing connectivity with other nodes of UAF takes place in line 17 of the pseudo code of FIG. 6 (see step S805 in FIG. 8A) and in line 39 of FIG. 6 (see step S833 in FIG. 8B). The cycle is re-initiated once a current cycle completes, hence the name Unidirectional.

Figure 14:
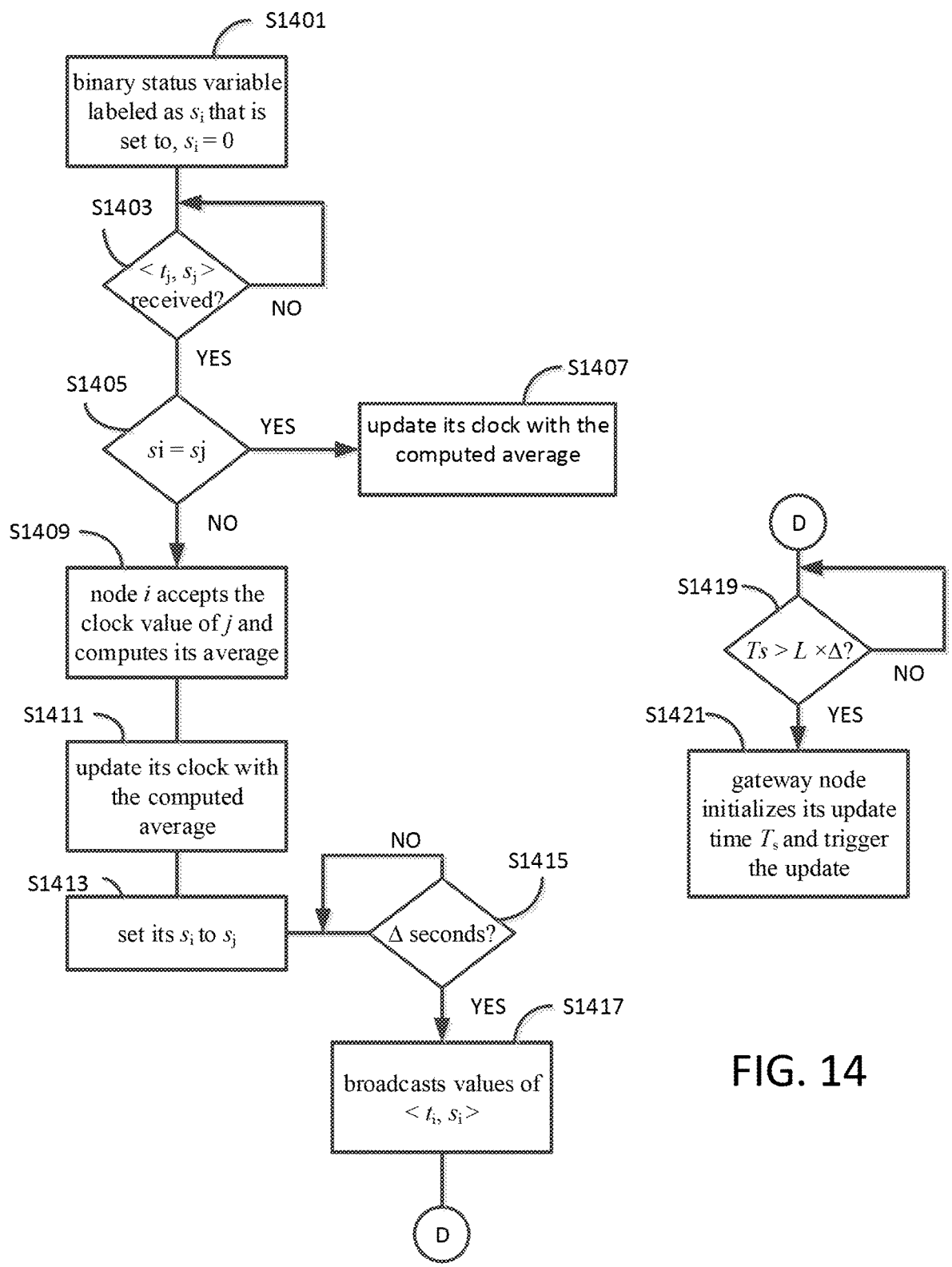
FIG. 14 is a flowchart of a unidirectional asynchronous flooding procedure of FIG. 12.

Operation Mechanism: The asynchronous activation cycle procedure is illustrated by FIGS. 12 and 13. FIG. 14 is a flowchart of the asynchronous activation cycle procedure. As shown in FIG. 12, layers of connectivity are defined for all network nodes based on their proximity to the gateway node.

In this procedure, all nodes belonging to a same connectivity layer wake up at the same time to carry out the averaging process, hence the name Synchronous Layer. To elaborate further on the operation of the method, the stages of operation are described as follows:

1. In S1401, each node i has a binary status variable labeled as $s_i$ that is set to, $s_i=0$
(Line 2). It is assumed that there is an upper bound L on the number of connectivity
layers, where L depends on the network size and topology. For example, for the network
in FIG. 13, L=4.

2. The gateway node initializes update timer $T_S$ and triggers the update of the nodes
connected to it.

3. Once a node i updates, it triggers the update of its nearest neighbor nodes, j whose
status bit variable, $s_j$ are a complement of its own, i.e., $s_i=s'_j$. Once the flooding of the
status bits variable begin, if i receives $<t_j, s_j>$ (Yes in S1403) such that, $s_i=s'_j$ (Line 4)
then,in S1409, node i accepts the clock value of j (Line 5) and computes its average
(Line 7), then, in S1411, updates its clock with the computed average and, in S1413, sets
its $s_i$ to $s_j$ (Line 8). If on the other hand, $s_i=s_j$, (YES in S1405) then nodes i and j belong
to the same connectivity layer or the connectivity layer of j lies above that of I (Line 9).
The node i doesn't wakeup to compute and update its clock and hence conserves energy.

4. Each node then, in S1417, broadcasts whatever values of $<t_i, s_i>$ it has every Δ
seconds (Lines 10-13; Yes in S1415).

5. This process continues until the timer of the gateway node is Ts>L×Δ (Yes in
S1419). When this event is true, in S1421, the gateway node initializes its update time $T_S$
and triggers the update.

Bidirectional Asynchronous Flooding (BAF)

In this section another aspect of the basic synchronization scheme is presented. This aspect does not require any regulation of the update wake-up sequence by the gateway node. Hence it can effectively operate in a sparsely distributed random network. In this method, another variable is introduced to make the network self-regulating in carrying out the update wake-up cycle and therefore removes the need for the centralized wake-up regulation seen in UAF. To achieve this, once the update wake-up cycle is initiated by the gateway node, the node(s) in the first and the last connectivity layers automatically carry out the regulation and does not depend on the gateway node for the regulation. There are two schemes for connectivity between layers: a Forward Synchronous Connectivity and a Backward
Synchronous Connectivity. In this aspect, the Time Sequential Procedure, as in FIG. 6, is performed. The approach to establishing connectivity with other nodes of BAF takes place in line 17 of the pseudo code of FIG. 6 (see step S805 in FIG. 8A) and in line 39 of FIG. 6 (see step S833 in FIG. 8B).

Figure 16:
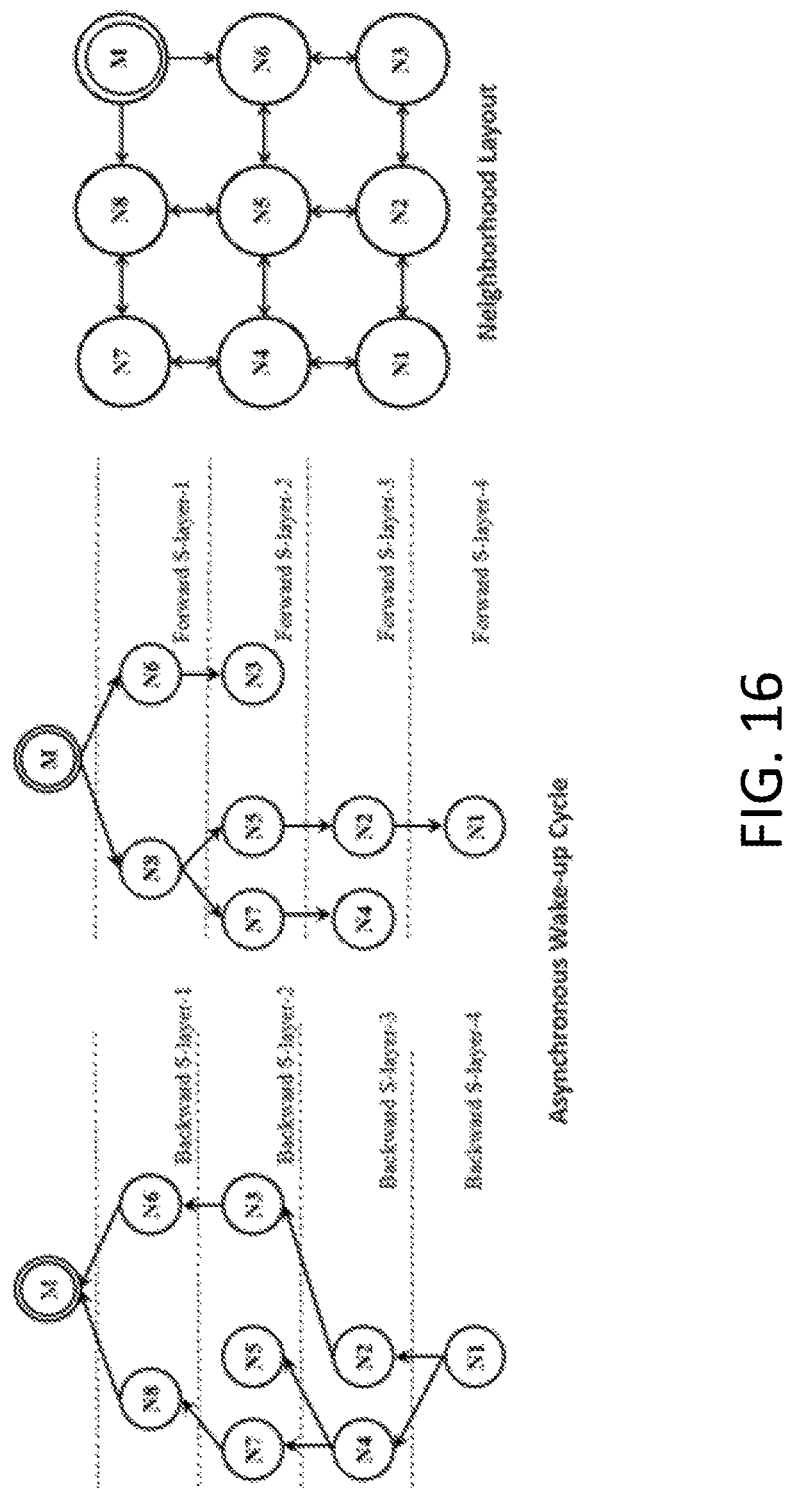
FIG. 16 is a diagram of an asynchronous wake-up cycle and operation mechanism for the bidirectional asynchronous flooding procedure in accordance with an exemplary aspect of the disclosure.
Figure 17:
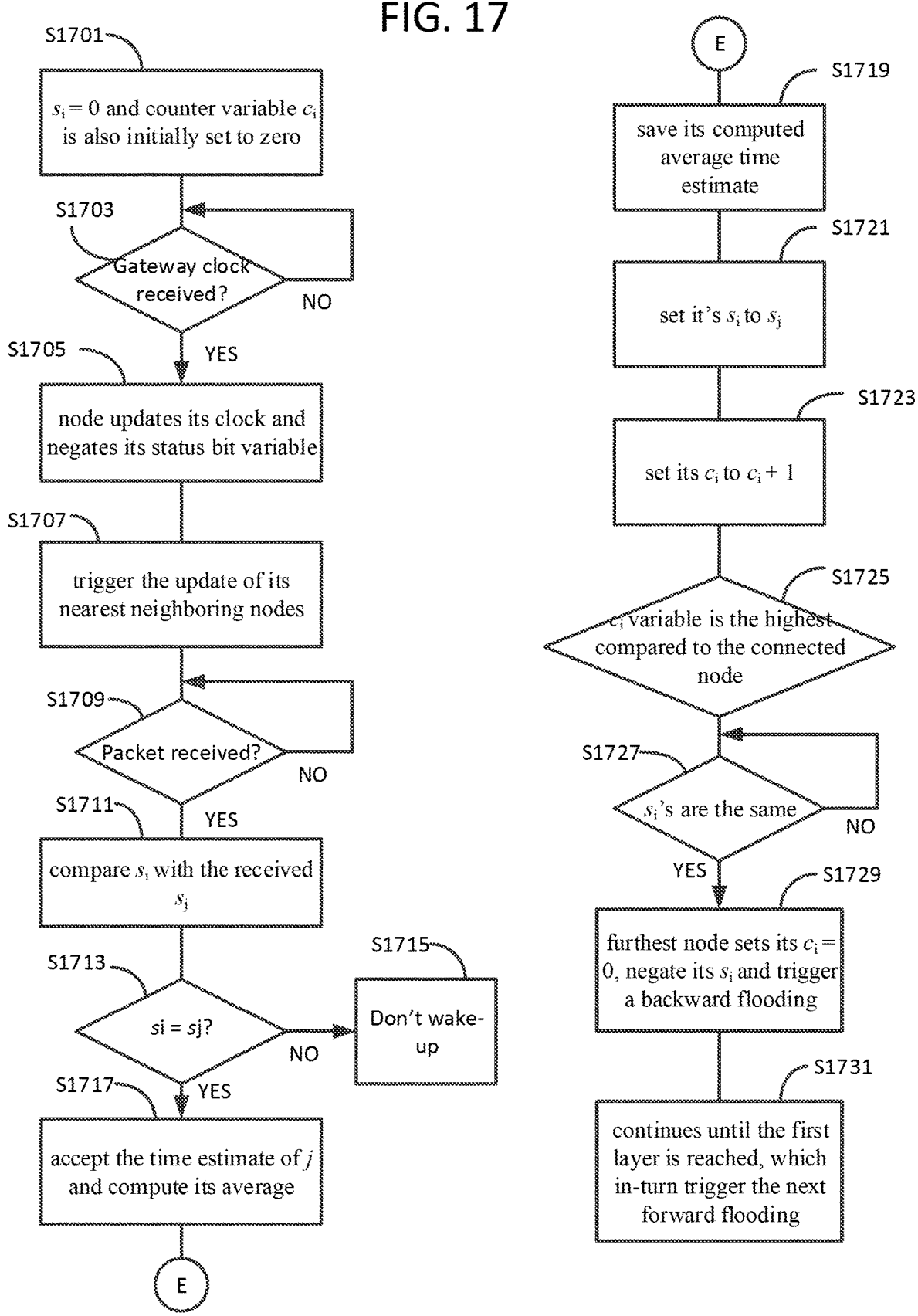
FIG. 17 is a flowchart of a bidirectional asynchronous flooding procedure of FIG. 15.

Operation Mechanism: The pseudo-code for BAF is presented in FIG. 15 and an asynchronous wake-up cycle and operation mechanism for BAF is illustrated in FIG. 16. FIG. 17 is a flowchart of the BAF procedure. The operation of BAF is described as follows:

1. In S1701, each node, i has a binary status variable labeled as si that is set to, si =0 and also has a counter variable ci that is also initially set to zero (Line 2).

2. The gateway node triggers the update of the nodes by broadcasting its clock values.

3. Once any node receives the gateway clock value (i.e. nodes in the Forward-S Layer-1 as shown in FIG. 16; Yes in S1703), in S1705, the node updates its clock and negates its status bit variable.

4. After doing stage 3, in S1707, the node triggers the update of its nearest neighboring nodes whose status bit is the complement of its own.

5. When a node i receives a packet from another node j (Line 3)(Yes in S1709), in S1711, it compares its si with the received sj and if si does not equal to sj (No in S1713), it means node j belongs to a layer that triggers the update of node i's layer.

6. If the event in 5 is true (Line 4) (Yes in S1713), then, in S1717, node i accepts the time estimate of j (Line 5) and computes its average (Line 6), then, in S1719, saves its computed average time estimate and, in S1721, sets it's si to sj (Line 8) and also, in S1723, sets its ci to ci+1 (Line 9). If on the other hand, if si=sj (Line 10) (Yes in S1713), then, in S1715, nodes i and j belong to the same connectivity layer or the connectivity layer of j does trigger the update of i for the current wake-up cycle and therefore it doesn't wake-up to compute and update its clock and hence conserves energy.

7. The process continues until, Yes in S1725, a node finds that its ci variable is the highest compared to the connected node and, Yes in S1727, their si's are the same, then this is the furthest node from the gateway node.

8. In S1729, this furthest node sets its ci=0, negates its si and triggers a backward flooding (Line 11).

9. In the backward flooding, all network nodes now have the complement of their initial si, i.e. s'i hence, in S1731, the process automatically continues until the first layer is reached, which in-turn trigger the next forward flooding.

Data Analysis

The properties of the disclosed synchronization procedure are thoroughly tested using both simulation and physical experiments using the MICAz which is a 2.4 GHz, IEEE/

Figure 18:
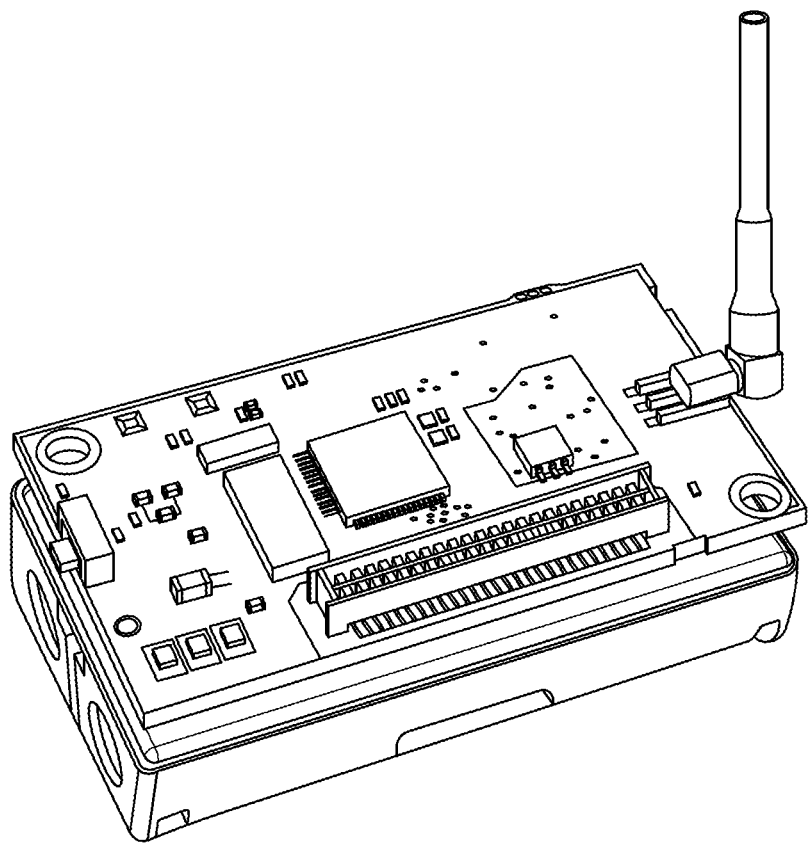
FIG. 18 is a perspective diagram of a wireless sensor node in accordance with an exemplary aspect of the disclosure.

ZigBee 802.15.4, mote (FIG. 18) developed by Memsic Inc. This mote is typically used for experimental evaluation of protocols designed for WSNs. Simulations are carried out on MathWorks MATLAB platform. In each simulation, it is assumed that there are perfect network conditions with no delays, jitters, fading and noise. Each node time is initialized as a random scalar between 0 and 1, i.e. $t_i(k=0)=rand[0-1]$ and the gateway time is initialized to 0, i.e. $t_g(k=0)=0$. The incremental time step and ticking rate of the gateway node $\Delta$ is taken to be 1ms.

Figure 19:
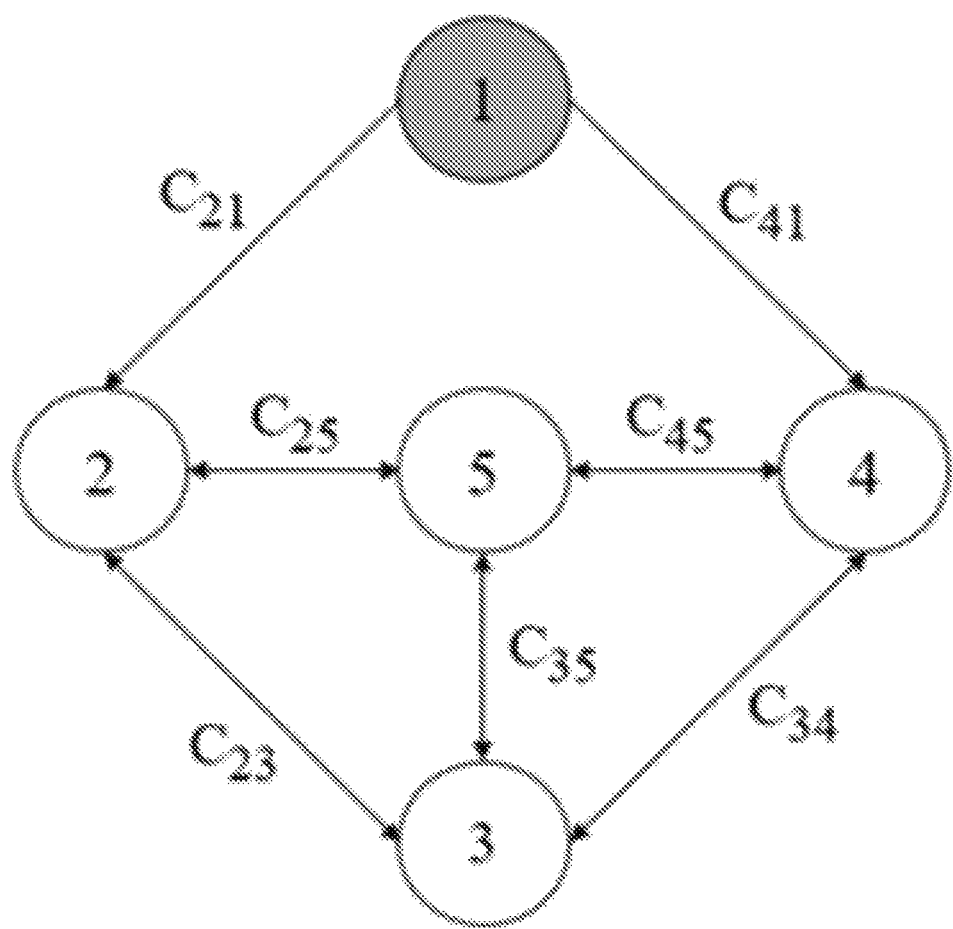
FIG. 19 is a network diagram for a network for a channel availability test.
Figure 20A:
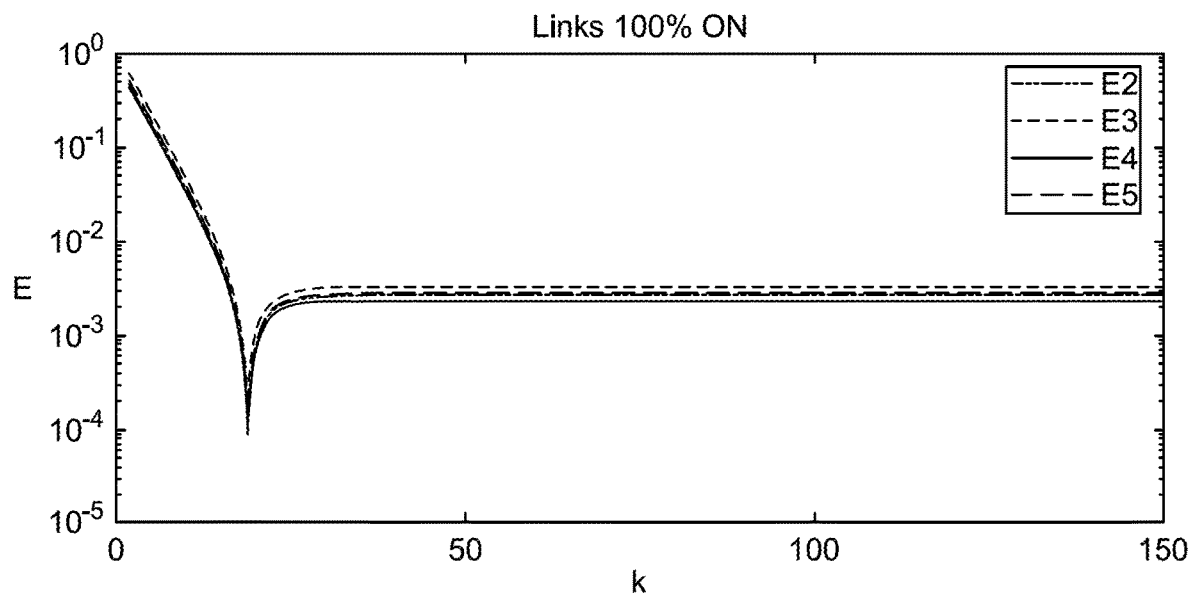
FIGS. 20A, 20B, 20C, 20D are graphs of the Node Error profiles for the Test Network for Different Probabilities of Channel Availability for TSAU.
Figure 20B:
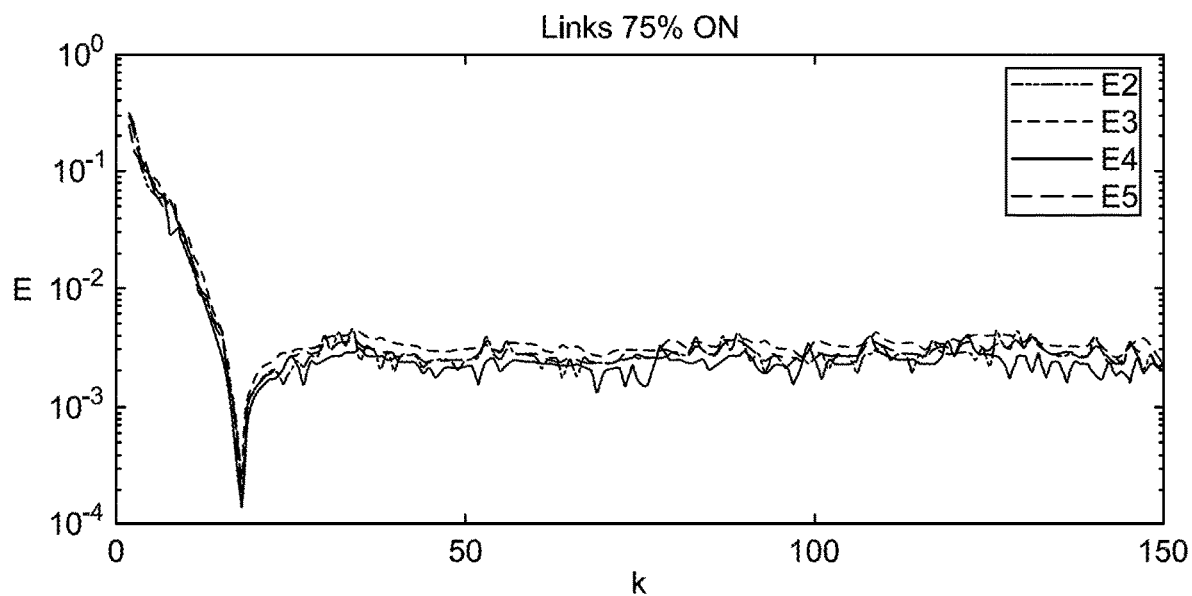
Figure 20C:
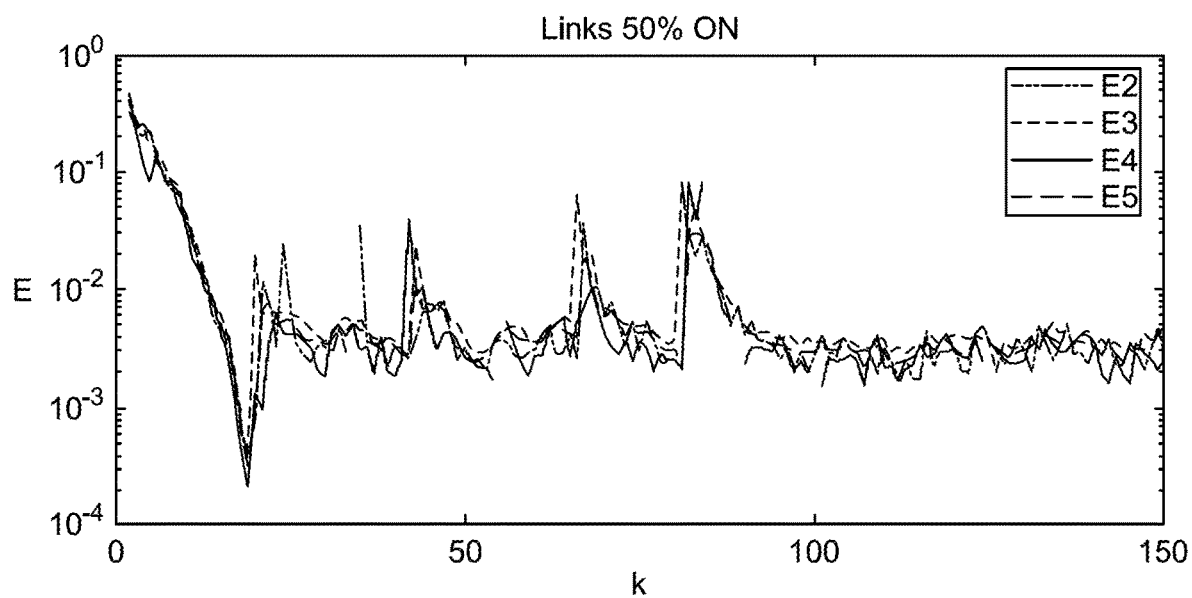
Figure 20D:
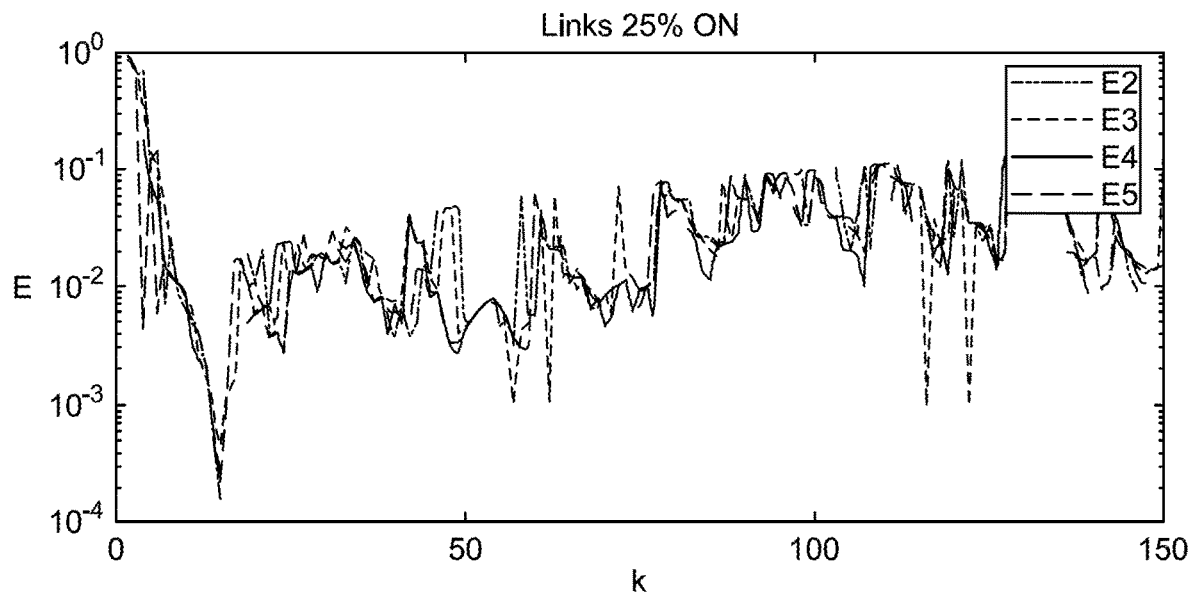
Figure 21A:
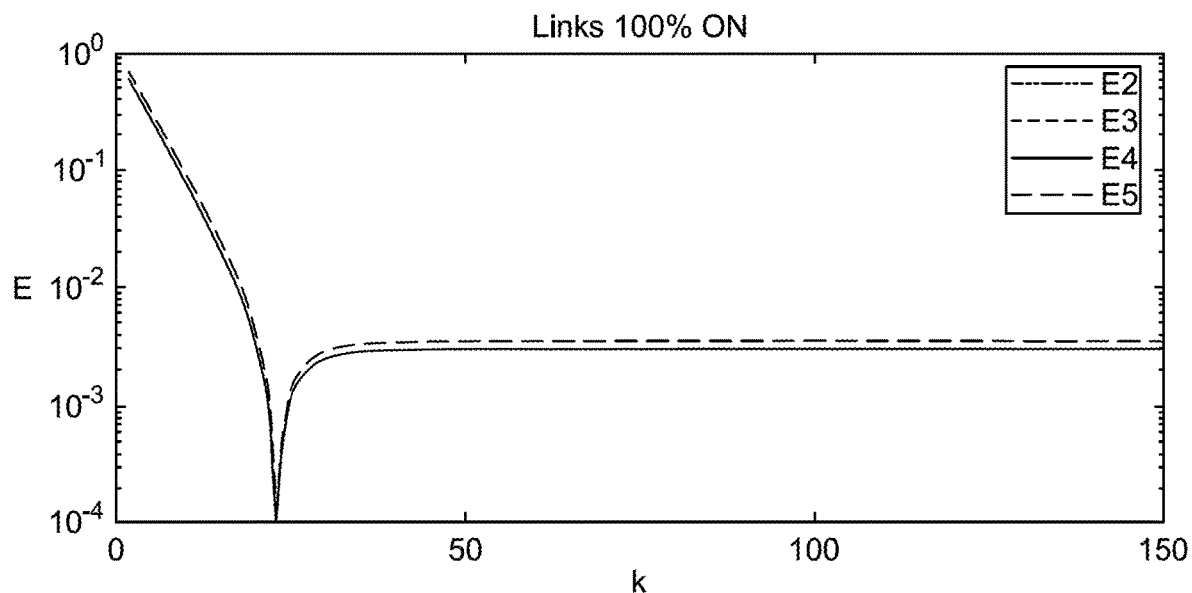
FIGS. 21A, 21B, 21C, 21D are graphs of Node Error profiles for the Test Network for Different Probabilities of Channel Availability for UAF.
Figure 21B:
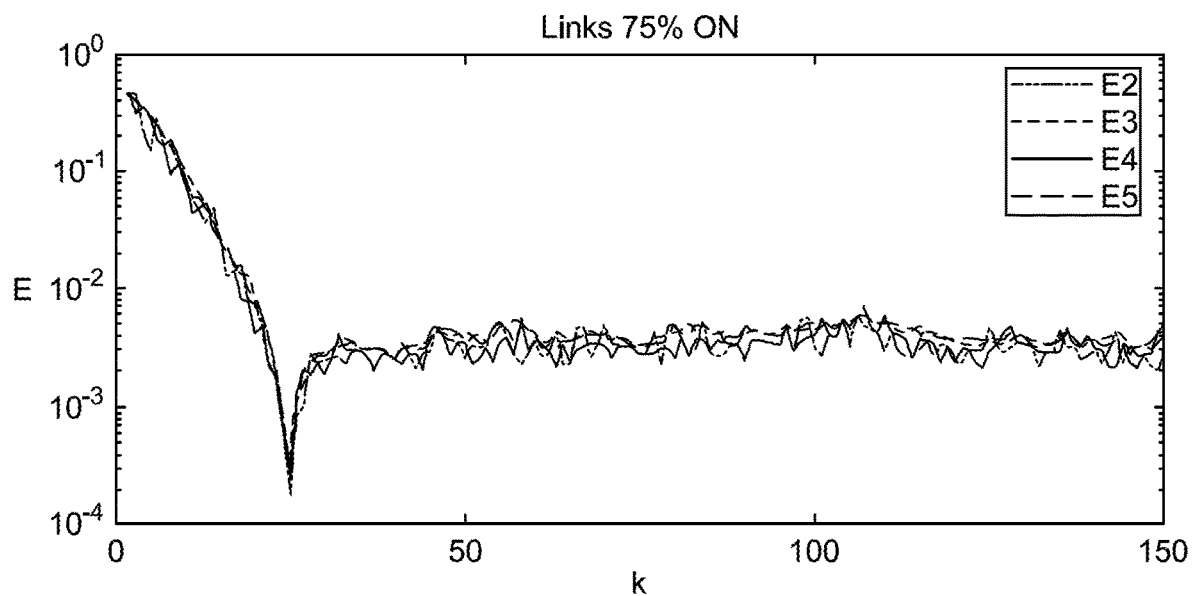
Figure 21C:
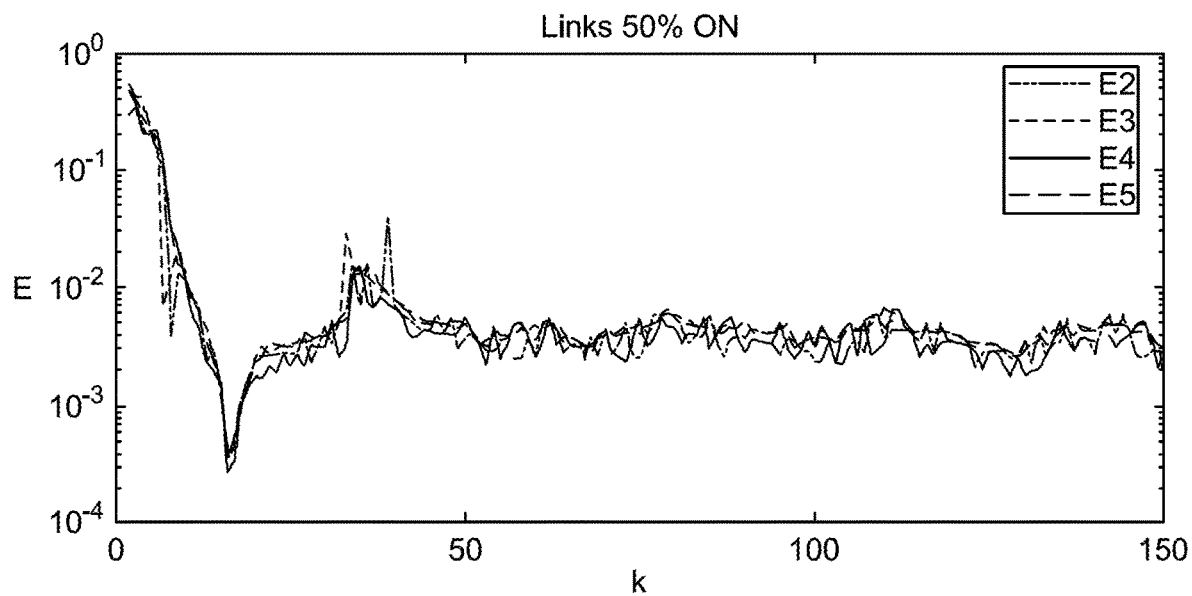
Figure 21D:
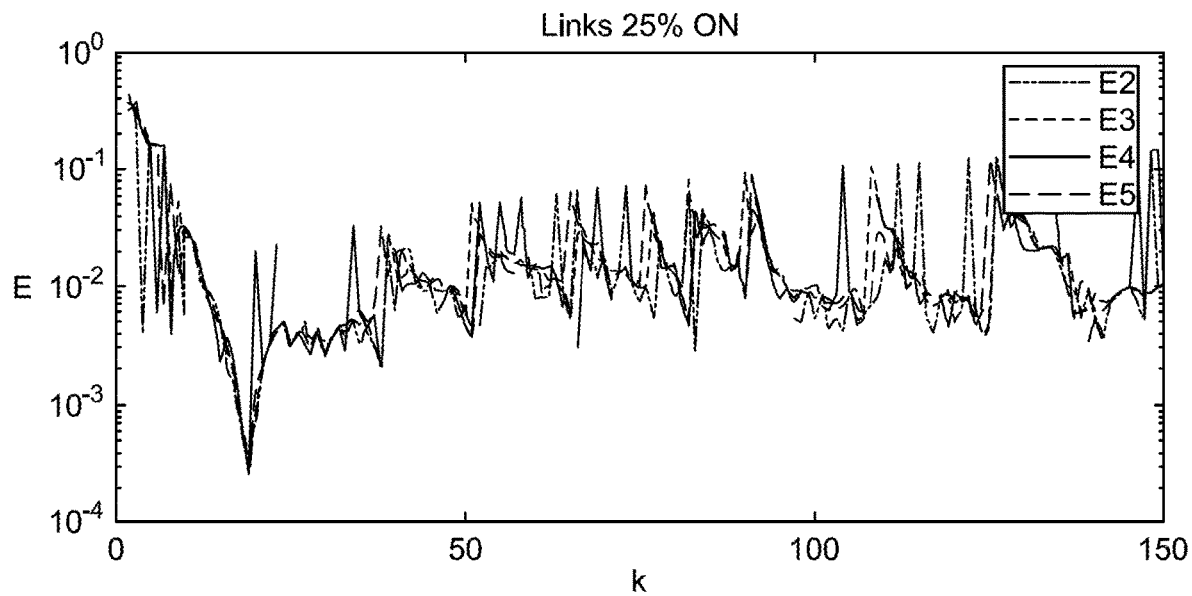
Figure 22A:
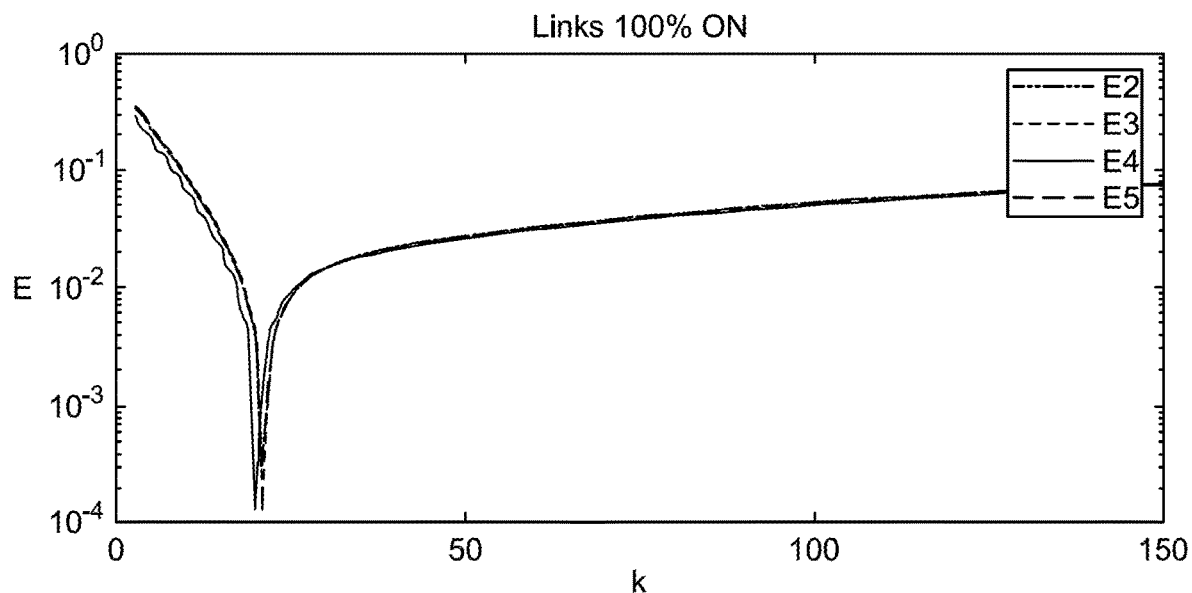
FIGS. 22A, 22B, 22C, 22D are graphs of Node Error profiles for the Test Network for Different Probabilities of Channel Availability for BAF.
Figure 22B:
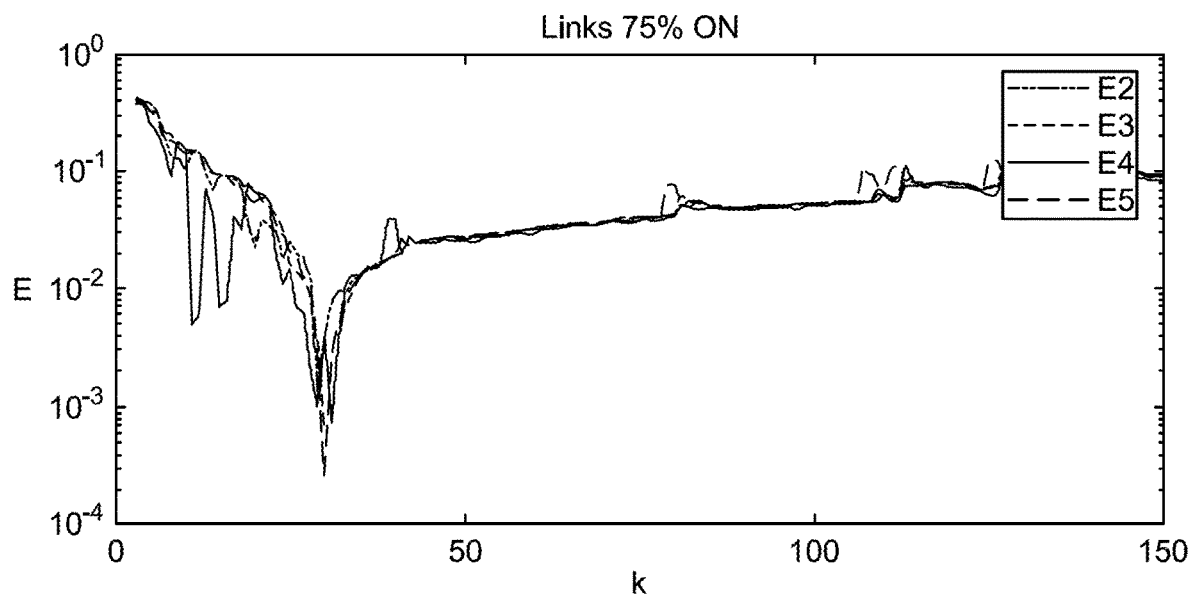
Figure 22C:
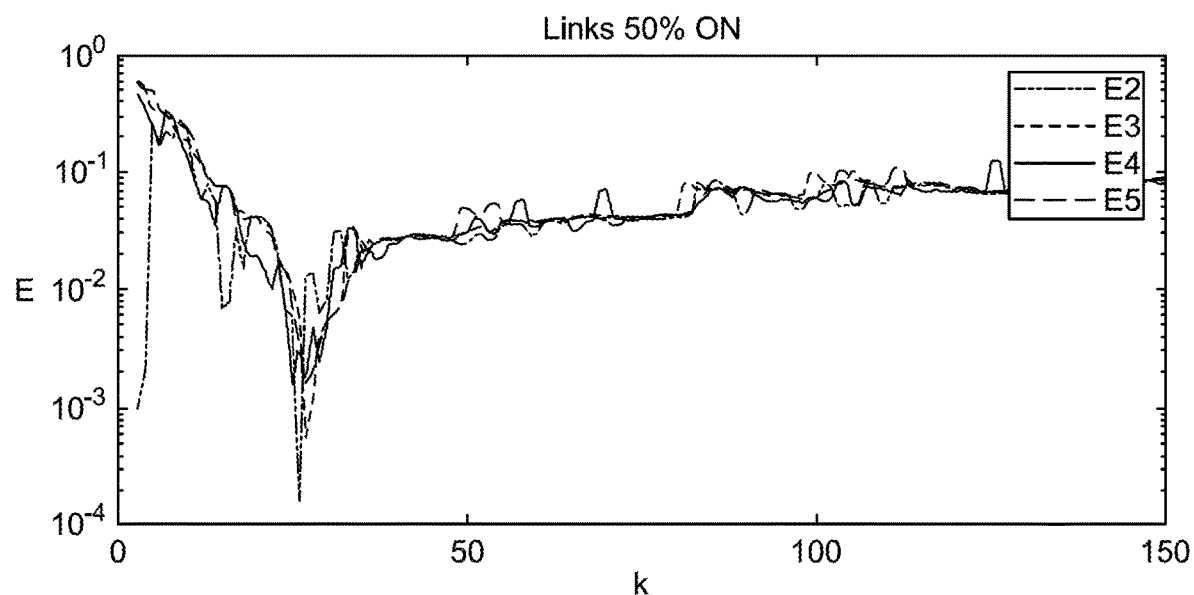
Figure 22D:
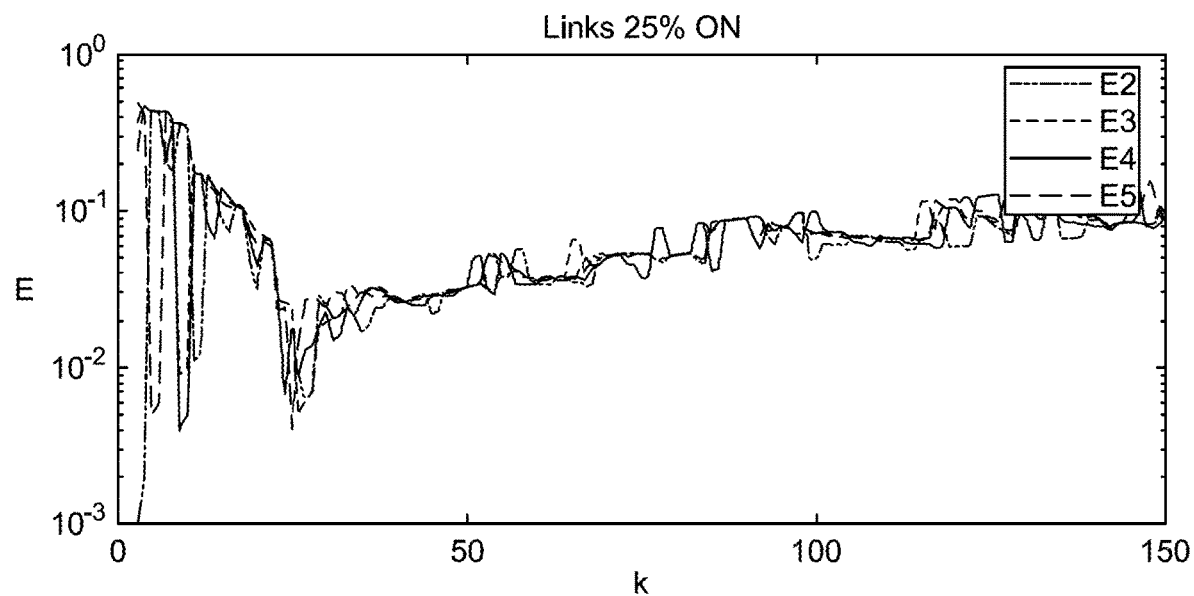

To test the error profile created by the averaging procedure, in particular the transient dip in the error profile, the test network in FIG. 19 is simulated on a network with random connectivity links. Node 1 is selected as the gateway node and a communication rate of 1 KHz is used. A connectivity function, $f(C_{ij})$ among nodes is modeled as a Bernoulli random variable with a discrete probability distribution function given by:

$$f(C_{i,j}) = \begin{bmatrix} p & C_{i,j} = 1 \\ 1-p & C_{i,j} = 0 \end{bmatrix}$$

Where p is the probability that the channel is on and the nodes are communicating and $C_{ij}$ is the channel connectivity binary variable which '1' if the channel between nodes i and j is active and functional and '0' otherwise. For each variation in the method, the error profile is provided for each node taken at four values for p: p=1 where the links are available 100% of the time, p=0.75,p=0.5 and p=0.25 where communication links malfunction 25%, 50% and 75% of the time, respectively. The error profile represents a graph of the error between the evolving time series of each node and the gateway node.

FIGS. 20 (20A, 20B, 20C, 20D), 21 (21A, 21B, 21C, 21D) and 22 (22A, 22B, 22C, 22D) show the error profiles for TSAU, UAF and BAF respectively. It is observed that, the dip characteristic persists in each profile at all levels of connectivity for all methods. As expected, the error profile becomes less well defined as the probability of links being active decreases. It is observed that, for all method variations, error values range between $10^{-1}$ and $10^{-4}$. Further, it is observed that the number of iterations required to reach the dip region is higher in UAF as compared to TSAU with BAF registering lowest errors for all nodes but the nodes are more tightly synchronized in UAF and TSAU as compared to BAF. Also for all method variations, it is observed that, the number of iterations required to reach the dip error remains nearly the same irrespective of link availability.

Figure 23:
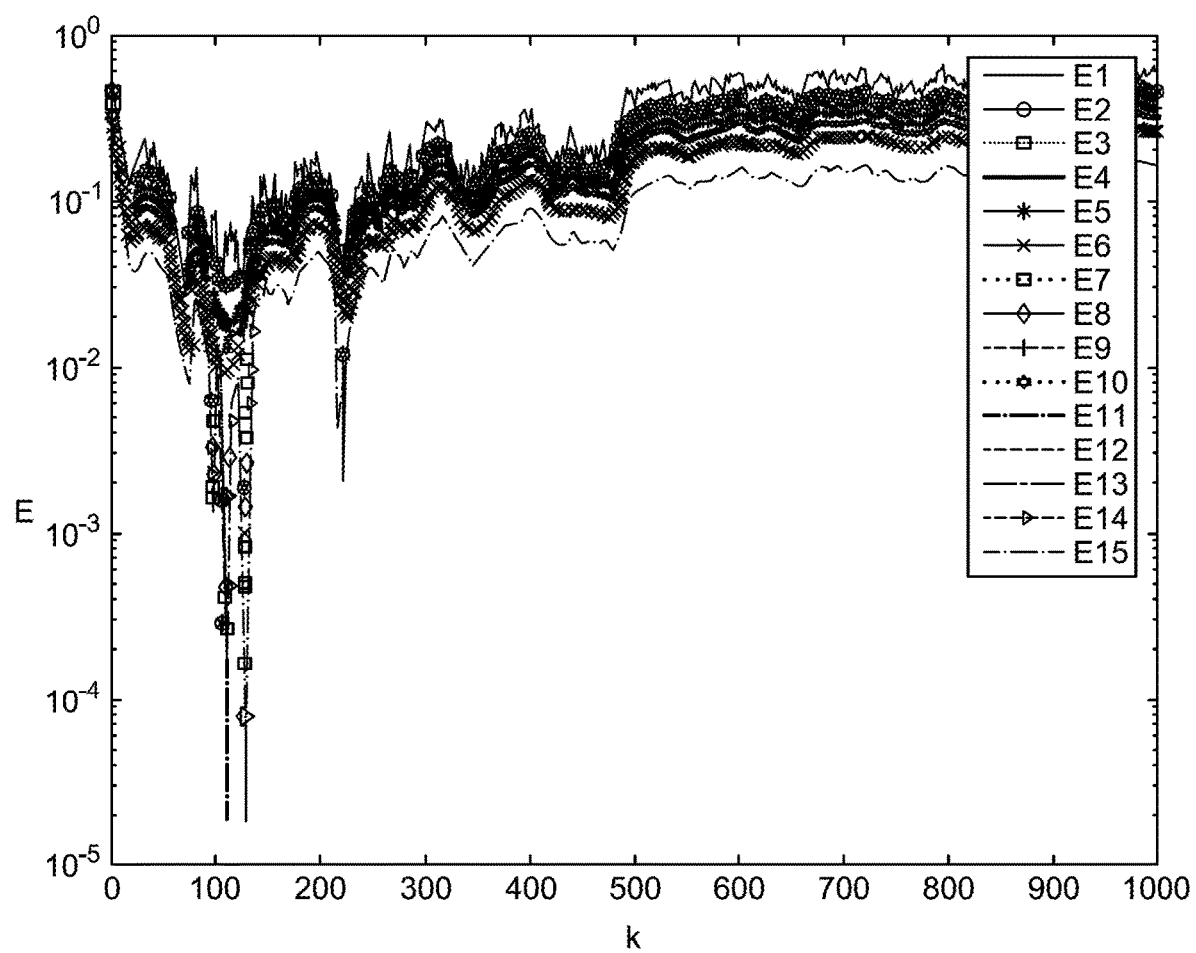
FIG. 23 is a graph of Node Error profile for the Test Network with Malicious Node for TSAU.
Figure 24:
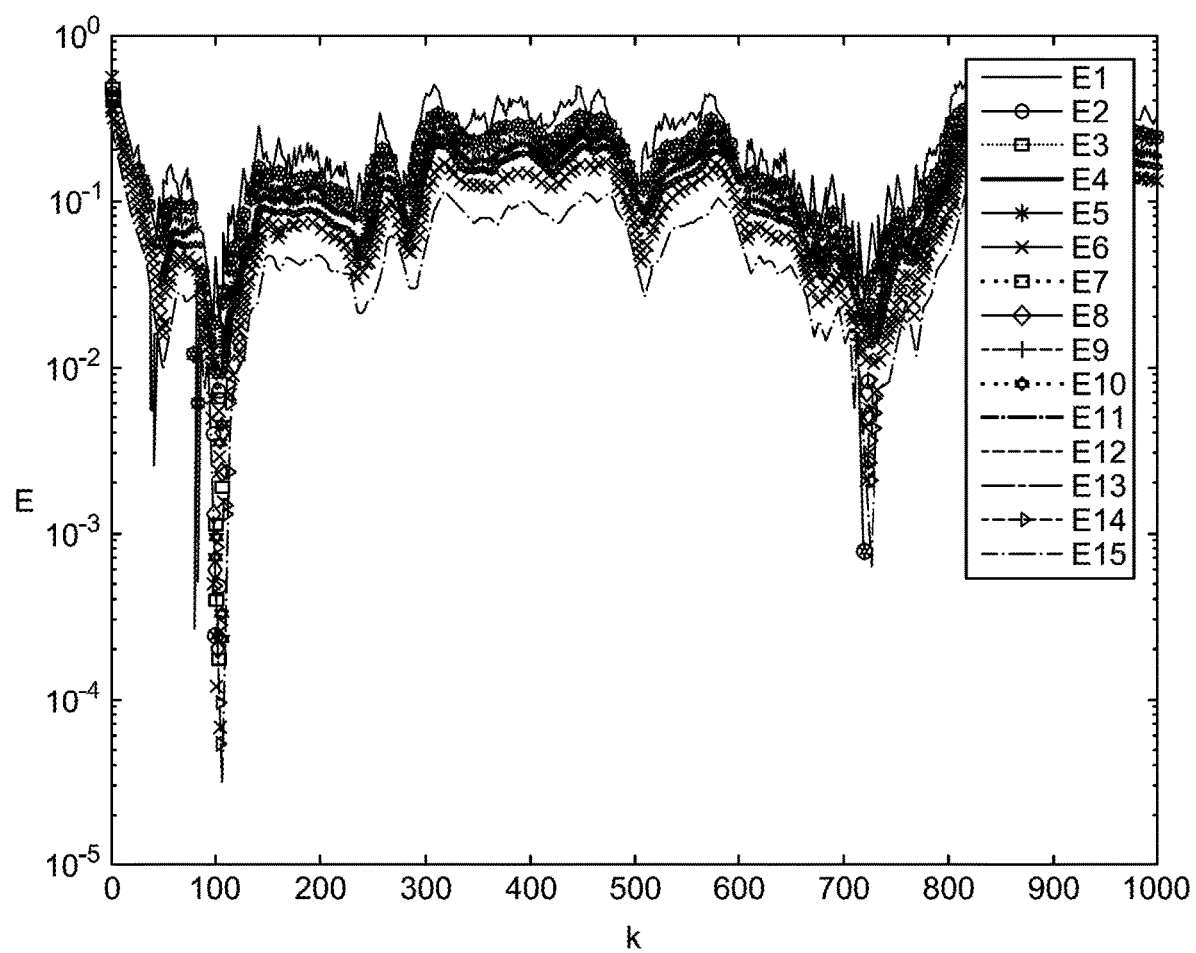
FIG. 24 is a graph of Node Error profile for the Test Network with Malicious Node for UAF.
Figure 25:
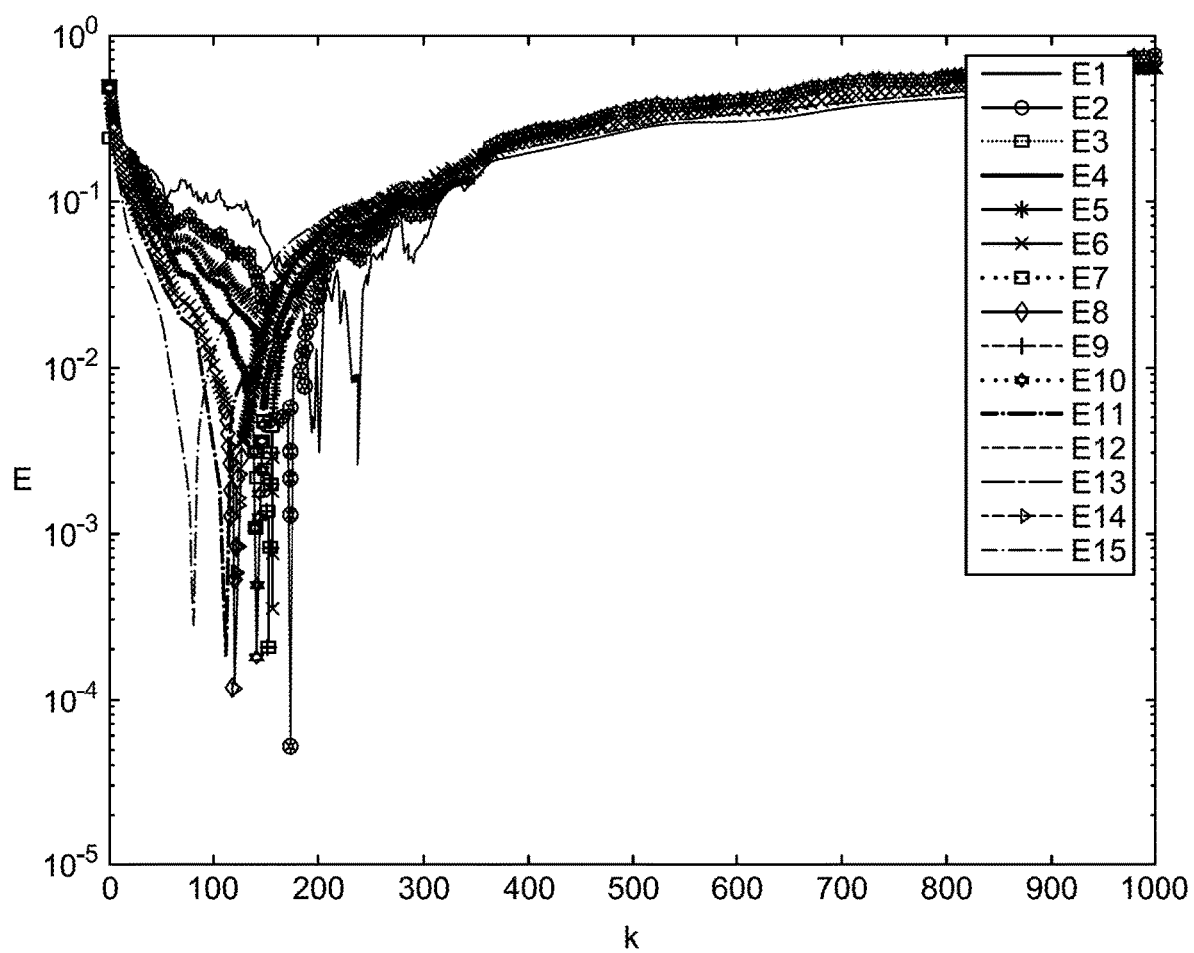
FIG. 25 is a graph of Node Error profile for the Test Network with Malicious Node for BAF.
Figure 26:
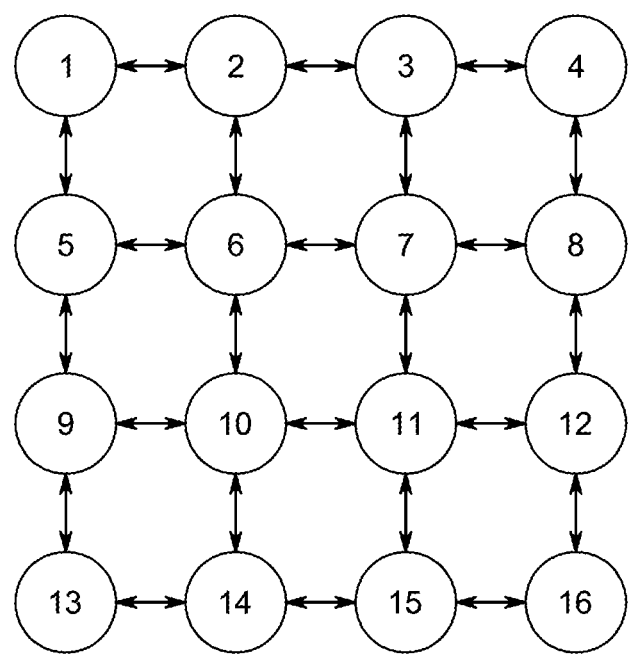
FIG. 26 is a network diagram of a 4×4 grid network.
Figure 27:
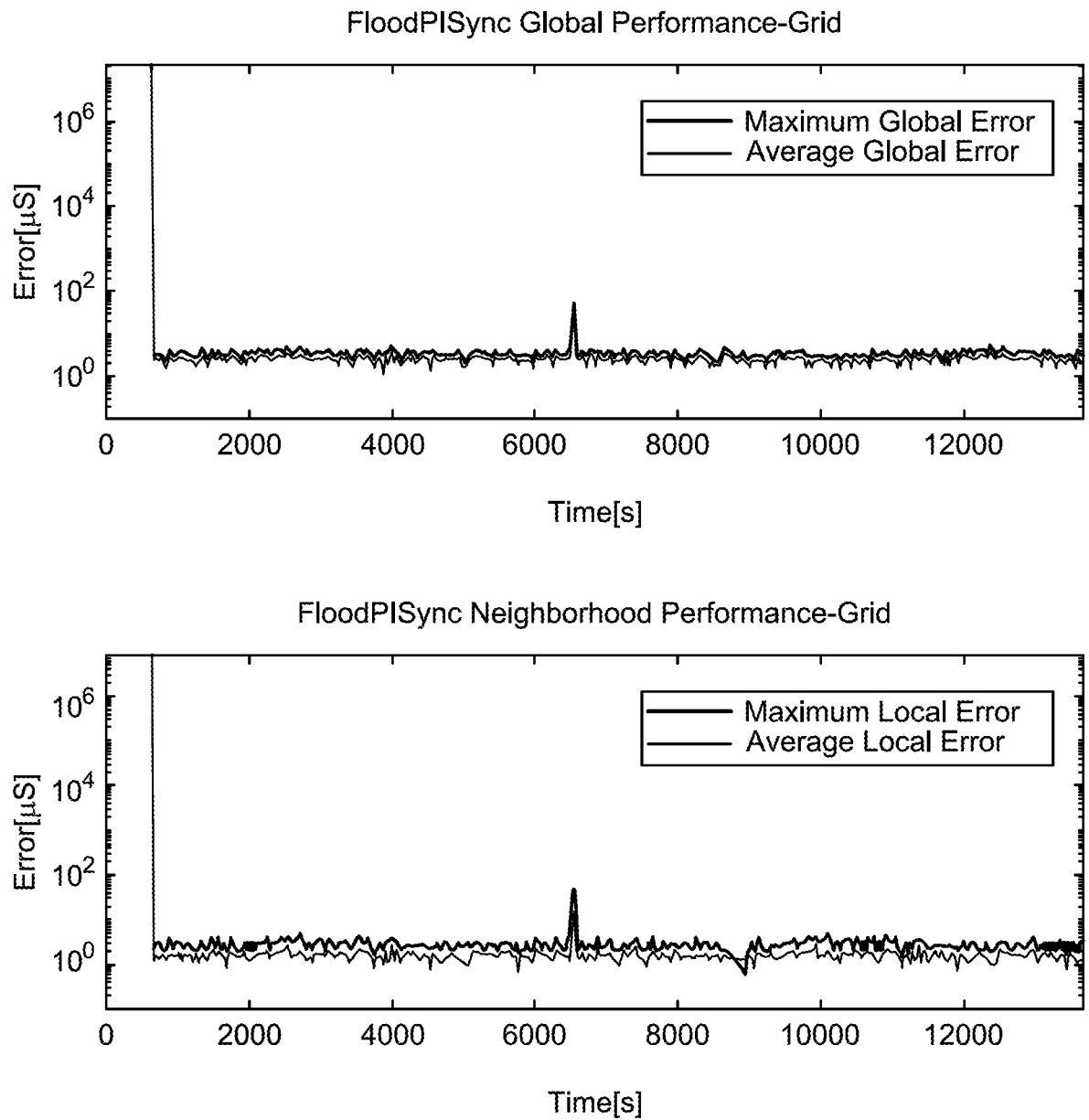
FIG. 27 are graphs of a FloodPISync Neighborhood and Global Synchronization Error for Grid Topology.
Figure 28:
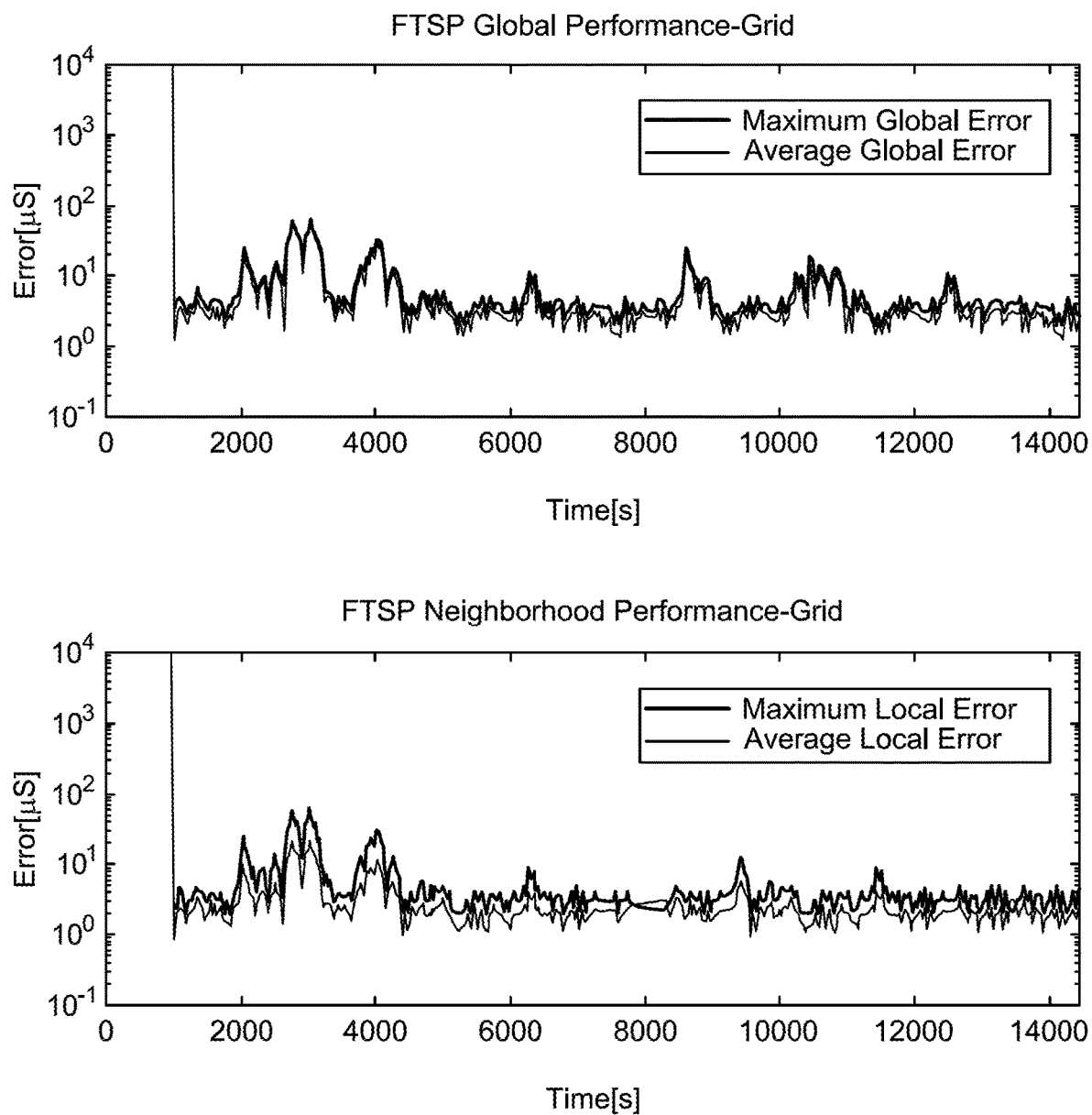
FIG. 28 are graphs of FTSP Neighborhood and Global Synchronization Error for Grid Topology.
Figure 29:
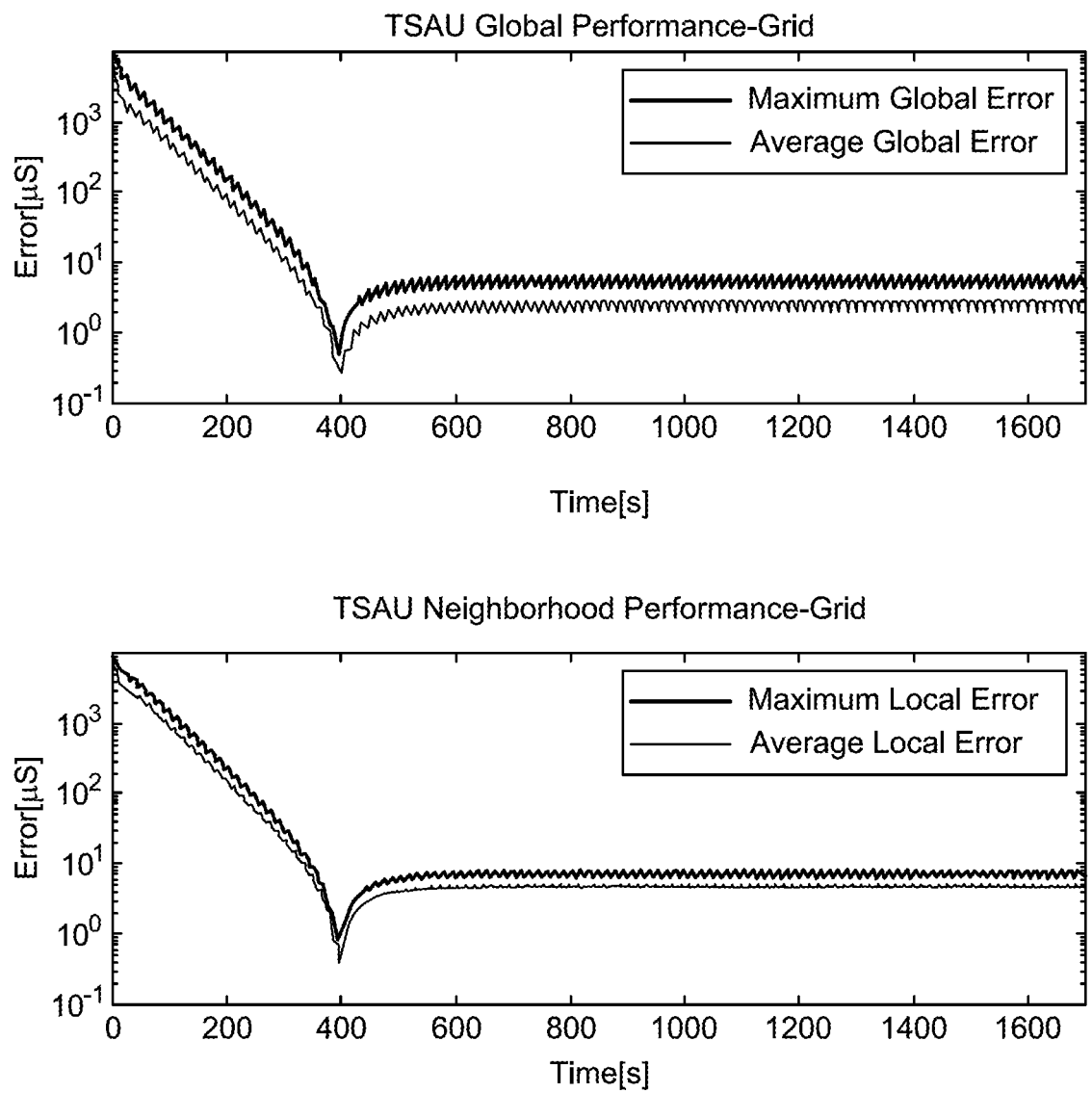
FIG. 29 are graphs of TSAU Neighborhood and Global Synchronization Error for Grid Topology.
Figure 30:
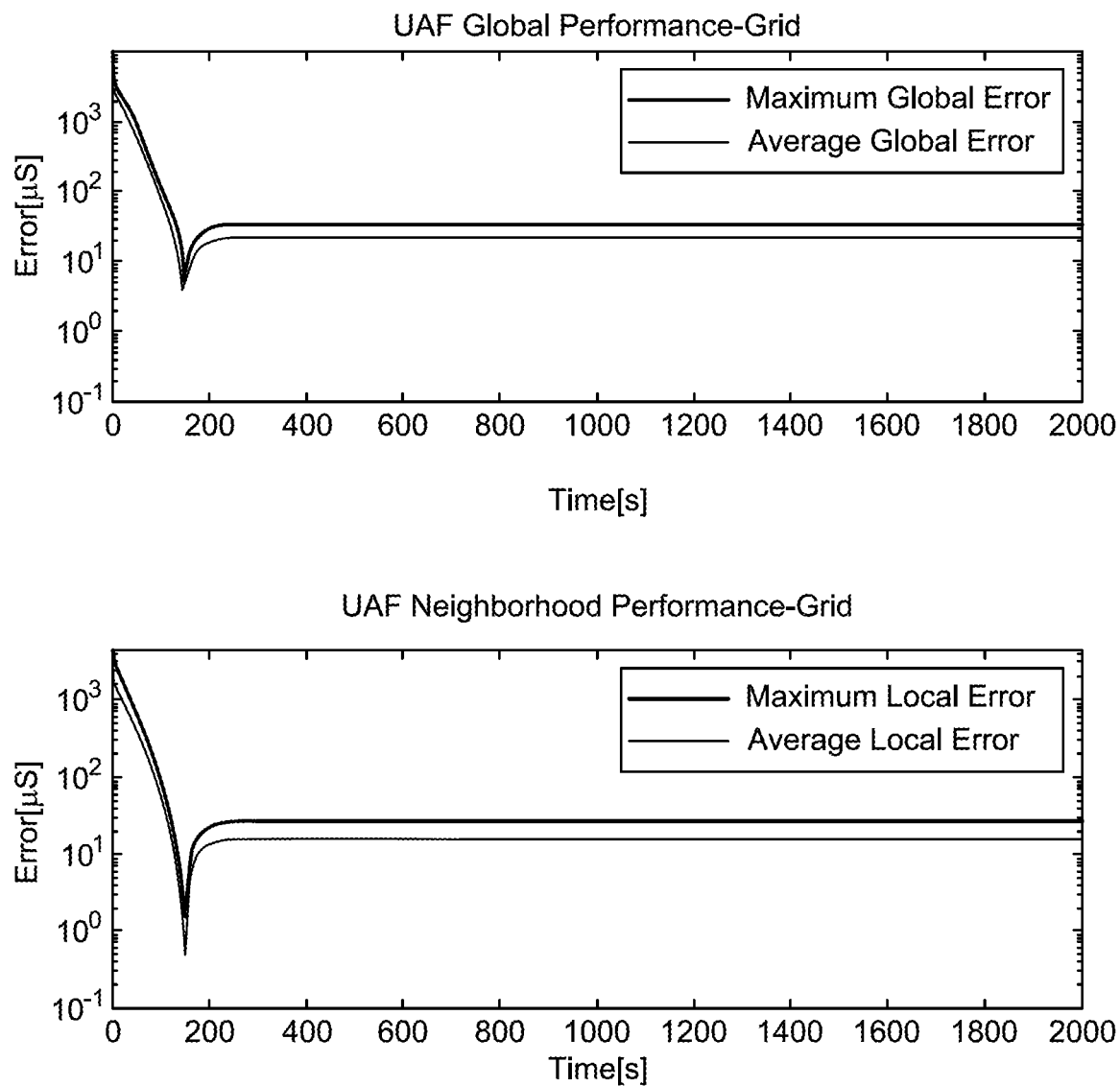
FIG. 30 are graphs of UAF Neighborhood and Global Synchronization Error for Grid Topology.
Figure 31:
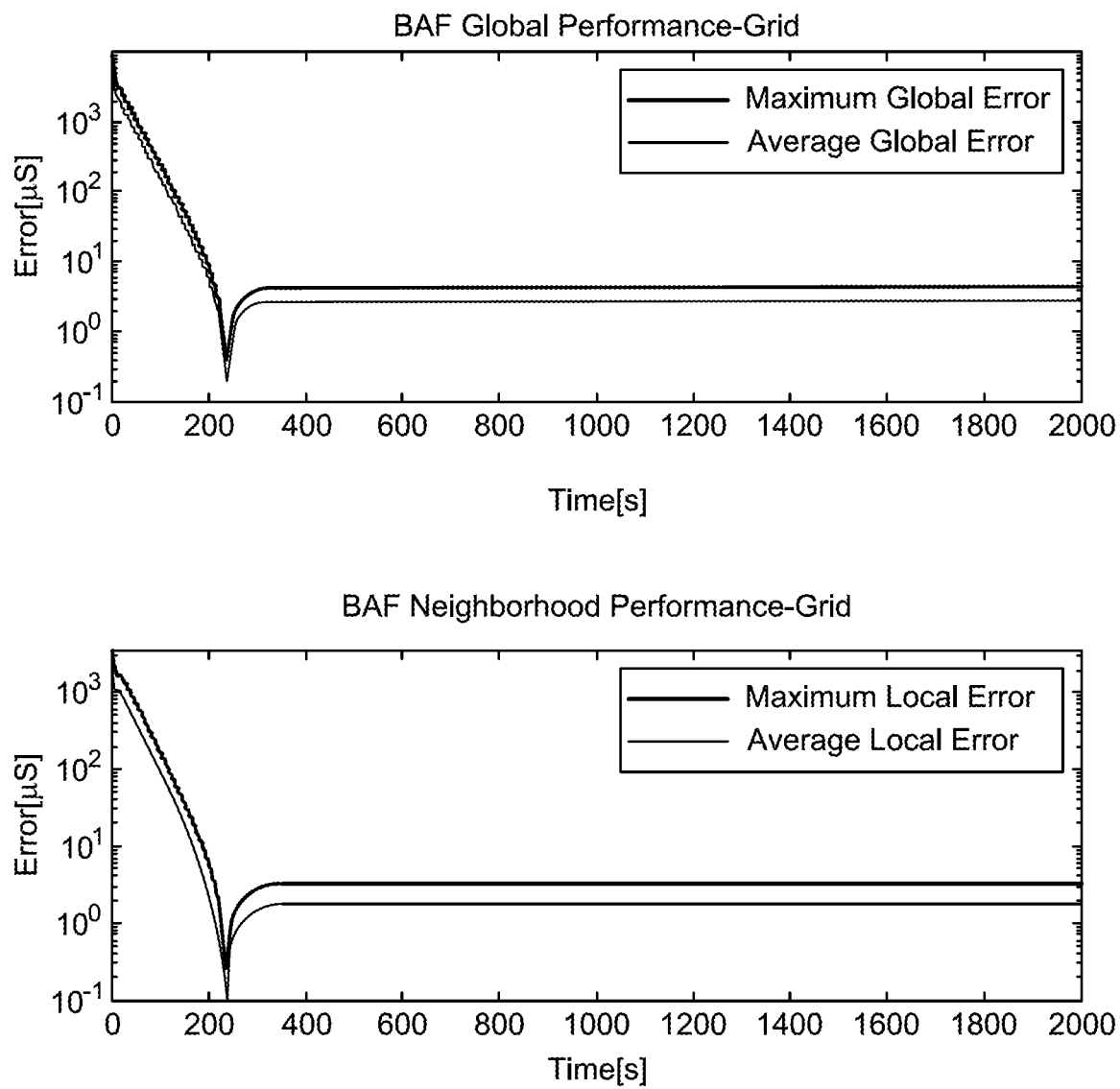
FIG. 31 are graphs of BAF Neighborhood and Global Synchronization Error for Grid Topology.

The behavior of each of the disclosed procedures when one network node, with the objective of disrupting the operation of the wireless sensor network injects random noise instead of true time estimates into the network is investigated. This node is named, a malicious node. This case normally occurs when hackers or saboteurs try to compromise the operation or setup of WSNs. In a simulation test for each disclosed procedure, the colored random noise is injected by the node furthest away from the gateway node into the network by transmitting values of this noise process at each communication instant. The generated noise signal has a unity standard deviation and zero mean value and power spectral density slope—6dB|octave. Colored noise is considered here rather than white noise because, although colored noise is malicious, is less detectable as compared to white noise and hence represent a preferred choice for saboteurs. FIGS. 23, 24 and 25 show the simulation results for TSAU, UAF and BAF respectively on a 16-node grid network with a malicious node. This network is given by FIG. 26. It is observed that, the dip characteristic appears in the error profiles of all the methods although not well defined. For all proposed method variations, the observed average minimum error is in the $10^{-4}$ range. For TSAU and UAF, the variance in the number of communication cycles required to reach minimum error in the dip region for all network nodes is smaller at around 3 as compared to that of BAF at approximately 1500. Hence it can be inferred that, BAF has a high convergence time when a malicious node exists in the network as compared to TSAU and UAF.

To assess the performance of the synchronizer in real time settings, experimental evaluations are carried out on a testbed of MicaZ sensor motes. Further experiments are carried out on Flooding Time Synchronization Protocol (FTSP) and Flooding Proportional-Integral Synchronization protocol (FloodPISync) found in the literature. FTSP and FloodPISync are flooding-based centralized protocols where time synchronization is done by synchronizing all network nodes to a reference node. In FTSP the estimation of the reference node clock is done using linear regression whereas FloodPISync, it is done by adjusting the node drifts and offsets using a proportional integral controller. The test networks employed for the evaluation are 16 node networks of grid and line topologies. For each protocol, how much access and flash memory, message length and CPU overhead it requires to effectively synchronize a network were evaluated. This is summarized in Table 1.

Based on the values in Table 1, the energy consumptions required for FTSP, FloodPISync, TSAU, UAF and BAF are calculated respectively as 130.4 µJ, 16.1 µJ, 14.53 µJ, 14.8 µJ and 16.4µJ It is observed here that the disclosed procedure variations consume about 9 times less than FTSP but have approximately similar consumptions as the PISync protocol.

To evaluate the synchronization accuracy for each procedure variation, the differences in clock values of network nodes has to be observed. This may be accomplished by collecting all nodes' clock values at each communication instant, k. Network-wide synchronization error at each communication instant is then calculated using the maximum global synchronization error and the average global synchronization error which presents a measure of the global synchronization accuracy for all nodes. Further, the synchronization error of nodes with respect to their neighbors is observed by using the maximum local synchronization error and the average local synchronization error.

The performance of each protocol is provided in terms of local and global errors for the grid topology. The maximum and average, local and global errors are presented for FTSP, FloodPISync, TSAU, UAF and BAF by FIGS. 27, 28, 29, 30 and 31 respectively. The critical values for these metrics including the convergence time are summarized in Table 2.

First, it is observed that, the global and local error curves for TSAU, UAF and BAF show a smoother characteristic as compared to FTSP and FloodPISync. This might stem from the fact that in the disclosed methods of time update, clock estimation is not done by an independent estimation of clock skew rate and offset like in these other protocols but is done by directly using the global logical time values. Although individual estimation of skew rate and offset is widely reported in a myriad of synchronization protocols, for the disclosed methods of synchronization, the skew rate and offset would still converge to a consensus value if for any network node, i, there exist a spanning path from this node to the gateway node.

Secondly, it is observed that the dip characteristics of the disclosed algorithm appear in all global and local errors. With a well-defined minimum error the disclosed methods are expected to locate the transient and stop update. This is a significant advantage for the disclosed synchronization procedure because unlike the other protocols where nodes are continuously communicating and estimating the global time through drift and offset compensation, sensor nodes running based on TSAU, UAF and BAF only need to identify the transient dip, stop updates and sleep to conserve a lot of energy. From the results, it is observed that the global and local errors for BAF far out perform all the other protocols as shown in Table 2. This is followed by TSAU then UAF. It is further observed from Table 2 that, FTSP outperforms FloodPISync on the grid topology in terms all the errors registering an average local error on 4.1µs as compared to 6.2µs for FloodPISync.

The disclosed synchronization procedures enable wireless sensor networks for monitoring harsh environments. Harsh environments in which a WSN may be deployed include forest fire detection, landslide detection, water quality monitoring, natural disaster prevention such as flood detection, waste water monitoring, air and water pollution, and nuclear, biological, and chemical detection.

The TSAU is particularly applicable to environments where a change in network topology may indicate an emergency situation developing, such as a forest fire, landslide, or flooding. The wireless sensor network may be deployed to detect a time variation of the wireless sensor network topology. Movement of sensor nodes in the case of a landslide or flooding may result in a wake-up activation sequence which might require different communication packet(s). In that case, failure of network nodes and connectivity between nodes may indicate location of the emergency situation, such as the location of a landslide or flooding.

In other harsh environments, the sensory nodes may be configured to monitor the environmental conditions so that measurements may be obtained during the emergency situation. In such case, the network topology may be arranged to obtain a mapping of temperature, pressure, and other environmental conditions to determine areas that are undergoing changes that may indicate the development of an emergency situation. The sensor network should be robust to loss of some sensor nodes due to failure in the vicinity of extreme conditions. The UAF and BAF synchronization procedures may be performed even while the network size and constituent sensor nodes changes.

In some embodiments, sensor nodes may be carried by mobile devices, such as mounted in unmanned aerial vehicles. Mobile devices such as unmanned aerial vehicles undergo variations in topology and are subject to sensor node and communication link failures. The BAF synchronization procedure may perform synchronization in a random network topology and is robust to communication link and sensor node failures.

Numerous modifications and variations of the present invention are possible in light of the above teachings. It is therefore to be understood that within the scope of the appended claims, the invention may be practiced otherwise than as specifically described herein.

The invention claimed is:

1. A system for monitoring at least one predetermined condition in a harsh environment, comprising:
   a plurality of wireless sensor nodes, each node including at least one sensor, a wireless communications device, a physical clock, and circuitry for a soft clock, the at least one sensor configured to detect the at least one predetermined condition;
   a gateway node including a wireless communications device and configured to maintain a gateway time value;
   a wireless communication network interconnecting the plurality of wireless sensor nodes and connecting at least one of the wireless sensor nodes to the gateway node; and
   an end-user computer device having access to the gateway node,
   wherein the wireless sensor nodes are configured to communicate time-stamped sensed data based on a local node time through the gateway node to the end-user device,
   each wireless sensor node is configured to remain in a sleep mode, then independently, when a triggering event is true, the circuitry for the soft clock
      evolves a value of a dynamical local time variable using time variable values communicated by at least one random other of the wireless sensor nodes that is within a single hop based on the harsh environment;
      infers from its dynamical local time variable the communication instant at which the dynamical local time variable is closest to the time value of the gateway node; and
      initializes the physical clock using the value of the dynamical local time variable at that instant to generate the local node time.

2. The system of claim 1, wherein the end-user device is configured to
   assign a node ID to each of the wireless sensor nodes based on proximity to the gateway node; and
   initialize the dynamical local time variable of each wireless sensor node as a sequence based on the node ID;
   wherein the circuitry of each wireless sensor node is configured to calculate an update of the dynamical local time variable at an update time that is based on the number of network nodes including the gateway node;
   the wireless communication device of each wireless sensor node is configured to wirelessly exchange synchronization packets with the other neighbor sensor nodes that are within one hop, in which the wireless communications device of each wireless sensor node transmits a broadcast packet of its current local time information every predetermined time;
   when the update is calculated, the circuitry of each wireless sensor node independently updates the dynamical local time variable to an average estimate of current time information received in the synchronization packets from the neighbor sensor nodes; and
   when a request for the local time variable value is not received for a second predetermined period of time, each wireless sensor node independently transitions to the sleep mode.

3. The system of claim 1, wherein the circuitry of each wireless sensor node is configured to independently update the dynamical local time variable asynchronously based on a wake-up from a sleep activation procedure regulated by the gateway node; and
   wherein the gateway node is configured to regulate the activation of the wireless sensor nodes by flooding the network with wake-up messages in every cycle of asynchronous update.

4. The system of claim 3, wherein the circuitry of each wireless sensor node is configured to independently maintain a binary status variable,
wherein the gateway node initializes an update timer and triggers the update of the wireless sensor nodes connected to it;
once the circuitry of a wireless sensor node updates its dynamical local time variable, it triggers the update of its nearest neighbor sensor nodes;
if the neighbor wireless sensor node receives a time value and the binary status variable is a complement of the triggering wireless sensor node, the neighbor wireless sensor node accepts the time value and the circuitry computes an average time as an update to its dynamical local time variable; and
if the binary status variable value is the same, the neighbor wireless sensor node does not wakeup from the sleep mode to compute and update its dynamical local time variable.

5. The system of claim 1, wherein the gateway node is configured to trigger the update of the wireless sensor nodes by broadcasting its clock values and the wireless sensor nodes update their dynamical local time variables;
wherein when a wireless sensor node is the farthest node, a backward flooding is triggered and wireless sensor node updating continues until the first layer of the wireless sensor nodes is reached; and
wherein when the first layer is reached, forward flooding to reach the farthest node is again triggered.

6. The system of claim 1, wherein a number of the wireless sensor nodes interconnected in the wireless communication network is increased.

7. The system of claim 1, wherein each of the wireless sensor nodes initially start with random values for their dynamical local time variable.

8. The system of claim 1, wherein each wireless sensor node is configured to operate its physical clock during sleep mode in order to monitor a time period until a wireless sensor node wakes up from the sleep mode.

9. The system of claim 2, wherein when a configuration of the wireless sensor nodes interconnected in the wireless communications network changes, the end-user device is configured to
reassign a node ID to each of the wireless sensor nodes based on proximity to the gateway node; and
reinitialize the dynamical local time variable of each wireless sensor node as a sequence based on the node ID;
wherein the circuitry of each wireless sensor node is configured to calculate an update of the dynamical local time variable at an update time based on a number of network nodes in the changed wireless communications network including the gateway node.

10. The system of claim 5, wherein the gateway node is configured to trigger the update of the wireless sensor nodes by broadcasting its clock values to the wireless sensor nodes and the wireless sensor nodes update their dynamical local time variables, wherein at least one of the wireless sensor nodes has failed and cannot update its dynamic local time variable.

11. A method of monitoring at least one predetermined condition in a harsh environment, performed in a system including a plurality of wireless sensor nodes, each node including at least one sensor, a wireless communications device, a physical clock, and circuitry for a soft clock, the at least one sensor configured to detect the at least one predetermined condition; a gateway node including a wireless communications device and configured to maintain a gateway time value; a wireless communication network interconnecting the plurality of wireless sensor nodes and connecting at least one of the wireless sensor nodes to the gateway node; and an end-user computer device having access to the gateway node, wherein the wireless sensor nodes are configured to communicate time-stamped sensed data based on a local node time through the gateway node to the end-user device, each wireless sensor node is configured to remain in a sleep mode, then independently, when a triggering event is true, the method, performed by circuitry for the soft clock, comprising:
evolving a value of a dynamical local time variable using time variable values communicated by at least one random other of the wireless sensor nodes that is within a single hop based on the harsh environment;
inferring from its dynamical local time variable the communication instant at which the dynamical local time variable is closest to the time value of the gateway node; and
initializing the physical clock using the value of the dynamical local time variable at that instant to generate the local node time.

12. The method of claim 11, further comprising:
wherein the end-user device is configured to
assigning, by the end user device, a node ID to each of the wireless sensor nodes based on proximity to the gateway node; and
initializing, by the end-user device, the dynamical local time variable of each wireless sensor node as a sequence based on the node ID;
calculating, by the wireless sensor node, an update of the dynamical local time variable at an update time that is based on the number of network nodes including the gateway node;
wirelessly exchanging, by the wireless communication device of each wireless sensor node, synchronization packets with the other neighbor sensor nodes that are within one hop, in which the wireless communications device of each wireless sensor node transmits a broadcast packet of its current local time information every predetermined time;
when the update is calculated, independently updating, by each wireless sensor node, the dynamical local time variable to an average estimate of current time information received in the synchronization packets from the neighbor sensor nodes;
and
when a request for the local time variable value is not received for a second predetermined period of time, independently transitioning, by each wireless sensor node, to the sleep mode.

13. The method of claim 11, further comprising:
independently updating, by each wireless sensor node, the dynamical local time variable asynchronously based on a wake-up from a sleep activation procedure regulated by the gateway node; and
regulating, by the gateway node, the activation of the wireless sensor nodes by flooding the network with wake-up messages in every cycle of asynchronous update.

14. The method of claim 13, further comprising:
independently maintaining, by each wireless sensor node, a binary status variable, initializing, by the gateway node, an update timer and triggering the update of the wireless sensor nodes connected to it;

once the circuitry of a wireless sensor node updates its dynamical local time variable, triggering, by the wireless sensor node, the update of its nearest neighbor sensor nodes;

if the neighbor wireless sensor node receives a time value and the binary status variable is a complement of the triggering wireless sensor node, accepting, by the neighbor wireless sensor node, the time value and computing an average time as an update to its dynamical local time variable; and if the binary status variable value is the same, the neighbor wireless sensor node does not wakeup from the sleep mode to compute and update its dynamical local time variable.

15. The method of claim 11, further comprising:

triggering, by the gateway node, the update of the wireless sensor nodes by broadcasting its clock values and updating, by the wireless sensor nodes, their dynamical local time variables;

wherein when a wireless sensor node is the farthest node, a backward flooding is triggered and wireless sensor node updating continues until the first layer of the wireless sensor nodes is reached, and wherein when the first layer is reached, forward flooding to reach the farthest node is again triggered.

16. The method of claim 11, further comprising:

increasing a number of the wireless sensor nodes interconnected in the wireless communication network.

17. The method of claim 11, further comprising:

initially starting each of the wireless sensor nodes with random values for their dynamical local time variable.

18. The method of claim 11, further comprising:

operating the physical clock of each wireless sensor node during sleep mode in order to monitor a time period until a wireless sensor node wakes up from the sleep mode.

19. The method of claim 12, wherein when a configuration of the wireless sensor nodes interconnected in the wireless communications network changes, the method further comprising:

reassigning, by the end-user device, a node ID to each of the wireless sensor nodes based on proximity to the gateway node;

reinitializing, by the end-user device, the dynamical local time variable of each wireless sensor node as a sequence based on the node ID; and calculating, by each wireless sensor node, an update of the dynamical local time variable at an update time based on a number of network nodes in the changed wireless communications network including the gateway node.

20. The method of claim 15, further comprising:

triggering, by the gateway node, the update of the wireless sensor nodes by broadcasting its clock values to the wireless sensor nodes; and updating, by the wireless sensor nodes, their dynamical local time variables, wherein at least one of the wireless sensor nodes has failed and cannot update its dynamic local time variable.

* * * * *